United States Patent
Yamashita et al.

(10) Patent No.: US 7,528,908 B2
(45) Date of Patent: May 5, 2009

(54) COLOR FILTER FOR LIQUID CRYSTAL DISPLAY AND SEMITRANSMISSION LIQUID CRYSTAL DISPLAY

(75) Inventors: Tetsuo Yamashita, Kyoto (JP); Ikumi Takiguchi, Otsu (JP); Hideyuki Kojima, Otsu (JP); Hiroyuki Sasaki, Shiga-gun (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/500,210

(22) PCT Filed: Nov. 27, 2002

(86) PCT No.: PCT/JP02/12363

§ 371 (c)(1),
(2), (4) Date: Jun. 28, 2004

(87) PCT Pub. No.: WO03/102638

PCT Pub. Date: Dec. 11, 2003

(65) Prior Publication Data

US 2005/0110923 A1  May 26, 2005

(30) Foreign Application Priority Data

Jun. 4, 2002 (JP) .............................. 2002-163031

(51) Int. Cl.
*G02F 1/1335* (2006.01)
(52) U.S. Cl. ..................................... 349/114; 349/106
(58) Field of Classification Search ................. 349/109, 349/107
See application file for complete search history.

(56) References Cited

U.S. PATENT DOCUMENTS 4,870,484 A  9/1989  Sonehara (Continued)

FOREIGN PATENT DOCUMENTS

EP  0973058 A1  1/2000

(Continued)

OTHER PUBLICATIONS

Machine Translated JP 2001-281648.*

(Continued)

*Primary Examiner*—David Nelms
*Assistant Examiner*—W. Patty Chen
(74) *Attorney, Agent, or Firm*—Morrison & Foerster LLP

(57) ABSTRACT

The present invention provides a low-cost transflective liquid crystal display exhibiting high color reproducibility in a transmissive display and excellent characteristics (color reproducibility and brightness) in a reflective display. Also, the present invention provides a color filter for a bright transflective liquid crystal display.

The transflective liquid crystal display includes a pair of substrates disposed opposite to each other with a liquid crystal layer held therebetween, a reflection means using ambient light as a light source, and a backlight source. The transflective liquid crystal display further includes a color filter having a transmissive region and a reflective region which are provided in each picture element of the color filter and which have colored layers comprising a single material, and a three-peak type LED backlight source.

6 Claims, 12 Drawing Sheets

U.S. PATENT DOCUMENTS

| | | | |
|---|---|---|---|
| 6,195,140 B1 | 2/2001 | Kubo | |
| 6,475,683 B1* | 11/2002 | Kashiwazaki | 430/7 |
| 6,501,521 B2* | 12/2002 | Matsushita et al. | 349/106 |
| 6,624,860 B1* | 9/2003 | Narutaki et al. | 349/106 |
| 6,867,833 B2* | 3/2005 | Chang et al. | 349/114 |
| 6,909,479 B2* | 6/2005 | Iijima | 349/109 |
| 2001/0040654 A1* | 11/2001 | Koike et al. | 349/106 |
| 2002/0003596 A1* | 1/2002 | Kim | 349/106 |
| 2002/0018159 A1* | 2/2002 | Kim et al. | 349/106 |

FOREIGN PATENT DOCUMENTS

| | | | |
|---|---|---|---|
| EP | 1109053 A2 | | 6/2001 |
| EP | 1109053 A3 | | 7/2001 |
| JP | 09-197979 A | | 7/1997 |
| JP | 2000-66199 A | | 3/2000 |
| JP | 2000-111902 | | 4/2000 |
| JP | 2001-33768 A | | 2/2001 |
| JP | 2001-33778 | | 2/2001 |
| JP | 2001-125094 A | | 5/2001 |
| JP | 2001281648 A | * | 10/2001 |
| JP | 2002-71938 A | | 3/2002 |

OTHER PUBLICATIONS

Nikkei Macrodevice (1998). Part 3-1, "New Market Development," (1) *In* Flat Panel Display, p. 126-129.

Nikkei Electronics (2002). "Leading Trends," *In* Nikkei Electronics, Feb. 25, 2002.

"Fine Process Technology," Text A5. Paper presented at the 9$^{th}$ FineProcess Technology Japan '99 Show & Conference, Tokyo, Japan, Jun. 30-Jul. 2, 1999.

The Society of Dyers and Colourists ed. (1992). *Colour Index International*. Third Edition, Fourth Revision, vol. 9. The Charlesworth Group: England.

* cited by examiner

COLOR FILTER FOR LIQUID CRYSTAL DISPLAY AND SEMITRANSMISSION LIQUID CRYSTAL DISPLAY

TECHNICAL FIELD

The present invention relates to a color filter for a liquid crystal display and a transflective display using the same.

BACKGROUND ART

Liquid crystal displays are now used for various applications such as notebook-size PC, mobile terminals, desktop monitors, digital cameras, and the like by making use of the characteristics of the liquid crystal displays, such as light weight, thinness, low power consumption, and the like. In order to further decrease the power consumption of a liquid crystal display using a backlight, the utilization efficiency of the backlight must be improved. Therefore, a color filter is required to have improved transmittance. Although the transmittance of the color filter is being improved every year, a significant decrease in power consumption is not expected from improvement in transmittance.

In recent years, the development of a reflective liquid crystal display not requiring a backlight source having high power consumption has been advanced, and it has been reported that the power consumption can be decreased to about ⅐ of that of a transmissive liquid crystal display (Nikkei Macrodevice, separate volume, Flat Panel Display, 1998, P. 126).

A reflective liquid crystal display has the advantage of low power consumption and excellent outdoor visibility. However, in a place where sufficient environment light cannot be secured, a display becomes dark, thereby causing the problem of significantly deteriorating visibility. In order to make a display visible in a place where environmental light has low strength, two systems each comprising a light source have been designed. One of the systems is (1) a liquid crystal display, i.e., a so-called transflective liquid crystal display, comprising a backlight as a light source and a reflection layer provided in each pixel and having a notch so that the a part of the reflection layer is used for a transmissive display system, and a part of the reflection layer is used for a reflective display system (refer to documents such as Fine Process Technology Japan '99, Expert Technology Seminar Text A5). The other system is (2) a reflective liquid crystal display comprising a front light.

As each of a backlight source and a front light source used for mobile terminals, a three-peak type fluorescent lamp or a white LED (light emitting diode) is used. The three-peak type fluorescent lamp is advantageous from the viewpoint of power consumption, and this fluorescent lamp is known to improve the color reproducibility of transmitted color light. Thus, the three-peak fluorescent lamp is used for relatively large mobile terminals such as a mobile PC, PDA, and the like. On the other hand, a white LED is advantageous for a smaller size and thickness and is used for small mobile terminals such as a cellular phone and the like.

White LEDs are divided into a two-peak type and a three-peak type according to the spectral shapes. The two-peak type white LED uses a combination of a blue LED and a phosphor, for obtaining a white color (FIG. 5). On the other hand, the three-peak type white LED uses a combination of an ultraviolet LED and red, green and blue phosphors (FIG. 1), or a combination of LEDs of the three colors, i.e., red, green and blue (FIG. 2), for obtaining a white color. The two-peak type white LED has been used as an option of the white LED light source so far (Nikkei Electronics, 2002, No. 2-25).

A transflective display comprising a backlight comprises picture elements in each of which a transmissive display using backlight and a reflective display using environmental light coexist, and thus a display with excellent visibility can be achieved regardless of the strength of environmental light. However, in the use of such a conventional color filter as shown in FIG. 6, i.e., a color filter in which a reflective region and a transmissive region are not provided in each picture element to cause uniform color characteristics within each picture element, a problem occurs in producing a vivid transmissive display. More specifically, when the color vividness (color purity) of transmitted color light is improved, the color purity of reflected color light is also further increased to significantly decrease brightness having a trade-off relation to color purity. Therefore, sufficient visibility cannot be obtained for reflective display. This problem is due to the fact that in the transmissive display, backlight is transmitted once through the color filter, while in the reflective display, environmental light is transmitted through the color filter two times-including the time of incidence and the time of reflection. In the transmissive display, the backlight is used as a light source, while in the reflective display, natural light is used as a light source. Therefore, the transmissive display and reflective display are different in not only color purity but also color tone. This is due to the fact that natural light has a continuous spectrum like the spectrum of light source D65 shown in FIG. 13, while the backlight source has spectral peaks at characteristic wavelengths, as shown in FIGS. 1 to 5.

A method for solving the above problem is a method in which a transparent resin layer is formed in each reflective region to thin a colored layer in each reflective region, thereby improving the brightness of a reflective display. This method is a so-called thickness controlling method and disclosed in Japanese Unexamined Patent Application Publication No. 2001-33778. FIG. 7 schematically shows a cross-section of a conventional color filter for a transflective liquid crystal display. A transparent resin layer 3 is formed in each reflective region 6 to decrease the thickness of a colored layer 5 in each reflective region 6, as compared with the thickness of the colored layer 5 in each transmissive region 7. In order that the colored layer in each reflective region has the same degree of brightness as that of the colored layer in each transmissive region, the thickness of the colored layer in each reflective region must be set to ½ or less of the thickness of the colored layer in each transmissive region. On the other hand, an increase in the degree of thinning of the colored layer in each reflective region causes large variations in the thickness, i.e., large variations in display colors, thereby causing a manufacture problem such as a reduction in yield, or the like. In consideration of processability and improvement in the brightness of the reflective display, the thickness of the colored layer in each reflective region must be set to about ½ to ⅖ of the thickness of the colored layer in each transmissive region. In this method for improving the color reproducibility in the transmissive display, with the above-described degree of thinning, sufficient brightness cannot be obtained in the reflective display, thereby causing the problem of failing to satisfy both a vivid transmissive display and a bright reflective display. Also, the problem in which the transmissive display and the reflective display have different color tones cannot be solved only by changing the thickness.

In the use of a color filter in which a transmissive region and a reflective region is coated separately, as shown in FIG. 8, color purity and brightness can be freely changed, thereby achieving a transmissive display color and brightness, and a reflective display color and brightness adequate for the purpose. In this method (six-color coating method), the color layers of the reflective regions are independent of those of the transmissive regions, and thus the reflective display with sufficient brightness can be achieved even when the color reproducibility of the transmissive display is increased. However, in a photolithography method which is a main stream at present, coating of a coloring agent and photolithography process are performed two times or more for forming picture elements of one color, and thus two lithography processes for each color, i.e., a total of six photolithography processes, are required for forming the picture elements of the three colors including red, green and blue, thereby causing the problem of increasing the manufacturing cost. When a coloring agent is coated in the transmissive regions (or the reflective regions), and then a coloring agent is coated in the reflective regions (or the transmissive regions), from the viewpoint of production, it is difficult to coat the coloring agents in such a manner that no space occurs between the transmissive regions and the reflective regions, and the coloring agents do not overlap with each other. Therefore, there is the possibility that the product yield is decreased to increase the manufacturing cost of the color filter. When spaces occur between the reflective regions and the transmissive regions, light leaks from the spaces to decrease the image quality of a liquid crystal display. On the other hand, when the coloring agents overlap with each other, the color only at the boundaries is increased and is possibly recognized as ununiformity on a screen. Furthermore, the cell gap of the liquid crystal display becomes defective. Namely, the yield of the liquid crystal display deteriorates to possibly increase the manufacturing cost of the liquid crystal display.

As a method capable of a transmissive display and reflective display with high color reproducibility, a method comprising forming an aperture in each reflective region to improve the brightness of the reflective display, i.e., an area controlling method, is disclosed in Japanese Unexamined Patent Application Publication No. 2000-111902. FIG. 9 schematically shows a cross-section of a conventionally known color filter for a transflective liquid crystal display having the apertures. In this case, only three times of photolithography processes are performed to permit the manufacture of a color filter at low cost. However, this method decreases the color purity-reflectance characteristics of the reflective display, as compared with the method in which the transmissive regions and the reflective regions are coated separately. Therefore, this method has the problem of failing to satisfy both color vividness and sufficient brightness. Particularly, when the color reproducibility is increased in the transmissive display and the reflective display, the brightness of the reflective display is decreased to cause the insufficient performance as a liquid crystal display.

In a conventional transflective liquid crystal display such as a mobile terminal or the like a two-peak type LED light source or three-peak type fluorescent lamp is used. However, a combination with a conventionally known low-cost color filer for a transflective liquid crystal display has the problem of failing to achieve a level in which both the high color reproducibility of the transmissive display and the sufficient brightness of the reflective display are satisfied.

DISCLOSURE OF INVENTION

The present invention has been achieved in consideration of the above problems, and an object of the present invention is to provide a low-cost transflective liquid crystal display capable of a transmissive display having high color reproducibility and a reflective display having excellent characteristics (color reproducibility and brightness). Another object of the present invention is to provide a color filter at low cost, which is capable of removing a difference in chromaticity between a reflective display and a transmissive display of a transflective liquid crystal display to exhibit excellent color characteristics and display characteristics.

The problems of the prior art can be resolved by the following requirements.

(1) A transflective liquid crystal display comprises a pair of substrates disposed opposite to each other with a liquid crystal layer held therebetween, a reflection means using ambient light as a light source, a backlight source, and a color filter having a transmissive region and a reflective region which are provided in each picture element of the color filter and which have colored layers comprising a single material, a three-peak type LED backlight source being used as the backlight source.

(2) The color filter used in the transflective liquid crystal display (1) includes the picture elements at least one color in each of which the transmissive region and the reflective region comprise the respective colored layers having the same thickness, and the reflective region has an aperture.

(3) The color filter used in the transflective liquid crystal display (1) includes the picture elements of at least one color in each of which the colored layers in the reflective region and the transmissive region have different thicknesses.

(4) The color filter used in that transflective liquid crystal layer (3) has the aperture formed in each reflective region.

(5) A color filter for a liquid crystal display comprises transmissive regions and reflective regions, wherein at least two types of colored layers are deposited in the transmissive region of each of picture elements of at least one color.

(6) In the color filter (5) for a liquid crystal display, a first colored layer is deposited in each transmissive region, and a second colored layer is deposited on the first colored layer and in each reflective region.

(7) In the color filter (5) for a liquid crystal display, a first colored layer is deposited in each of the transmissive regions and the reflective regions, and a second colored layer is deposited on the first colored layer in each transmissive region.

(8) In the color filter (5) for a liquid crystal display, the transmissive region and the reflective region in each of the picture elements of at least one color comprise a single coloring agent, and each reflective region has a transparent region.

(9) In the color filter (5) for a liquid crystal display, green colored layers having different pigment compositions are laminated.

(10) In the color filter (5) for a liquid crystal display, red colored layers having different pigment compositions are laminated.

(11) In the color filter (10) for a liquid crystal display, a red colored layer containing a pigment having a quinacridone skeleton is laminated on another colored layer. (12) In the color filter (5) for a liquid crystal display, blue colored layers having different pigment compositions are laminated.

(13) In the color filter (5) for a liquid crystal display, a single colored layer is laminated on the blue colored layer and the red colored layer so that the area of a coloring agent laminated on the blue colored layer is smaller than that laminated on the red colored layer.

(14) In the color filter (5) for a liquid crystal display, an over coat layer is deposited on the colored layers.

(15) The color filter (5) for a liquid crystal display does not contain a picture element having a chromaticity difference δ satisfying the following relation between transmissive region chromaticity (x0, y0) and reflective region chromaticity (x, y):

$$\delta=(x-x0)^2+(y-y0)^2 \geqq 1\times 10^{-3}$$

(16) A transflective liquid crystal display comprises the color filter (5).

Although the three-peak type light source is known to improve color reproducibility of a transmissive display, in the present invention, it was found that the three-peak type light source may improve not only the color characteristics of a transmissive display but also the color characteristics of a reflective display using environmental light. In a specified color filter structure, i.e., an area controlling system or thickness controlling system, the color characteristics can be improved. It was also found that in the use of a LED light source as the three-peak type light source, the characteristics of the reflective display can be significantly improved.

Figure 1:
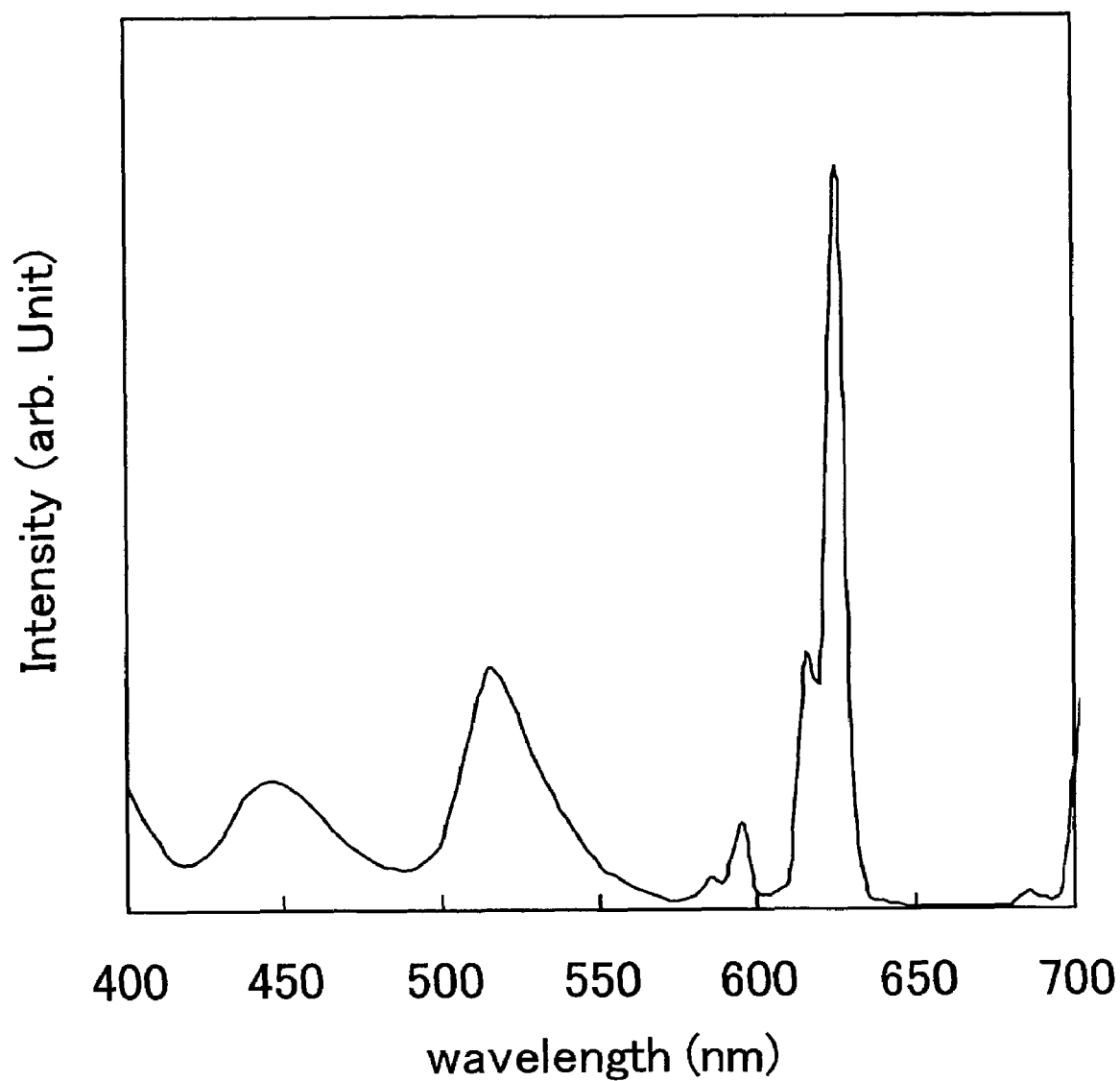
FIG. 1 is a chart showing an example (ultraviolet LED+red, green and blue phosphors) of the spectrum of a three-peak type light source used in the present invention.
Figure 2:
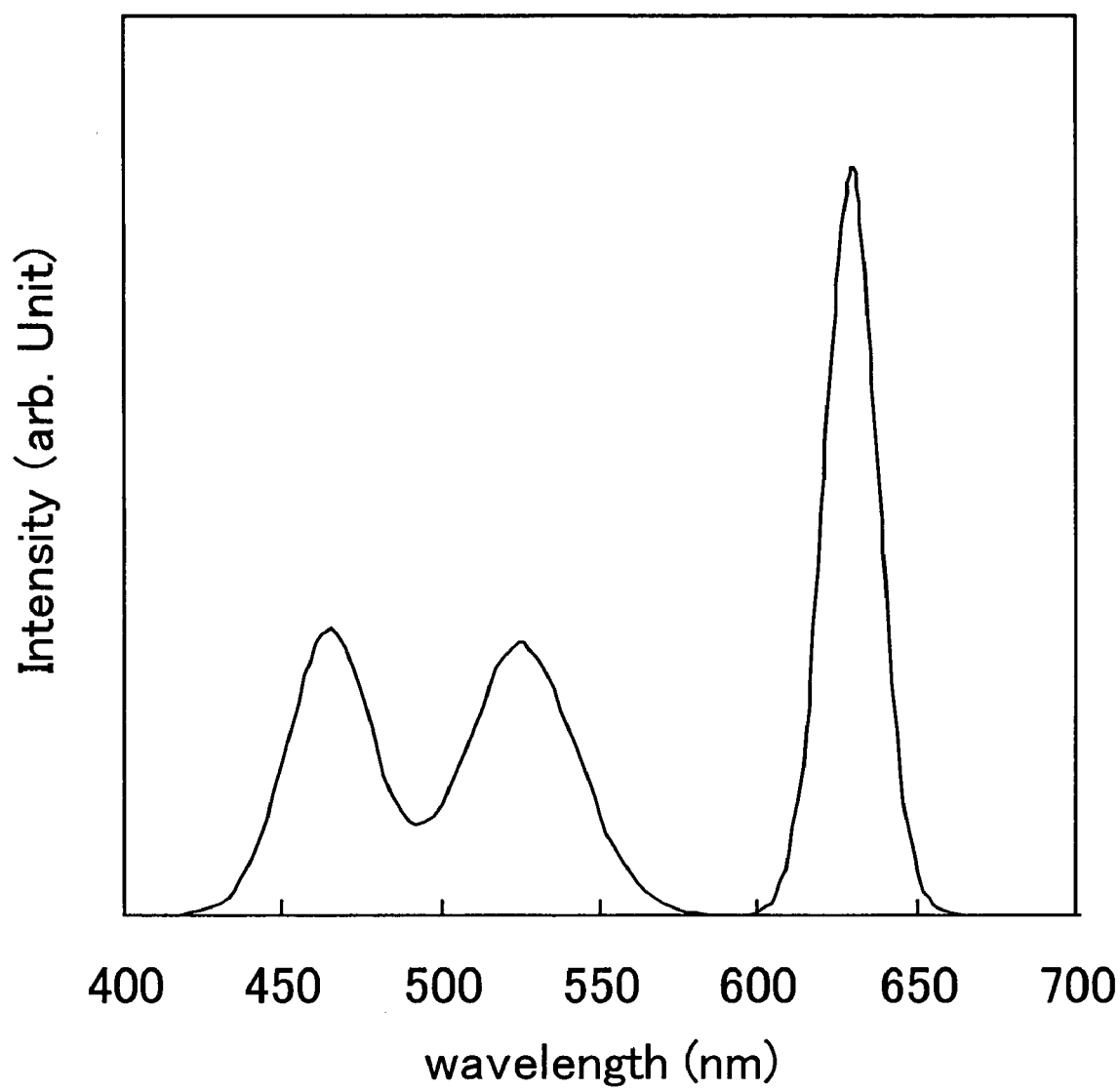
FIG. 2 is a chart showing an example (combination of red, green and blue LEDs) of the spectrum of a three-peak type light source used in the present invention.
Figure 3:
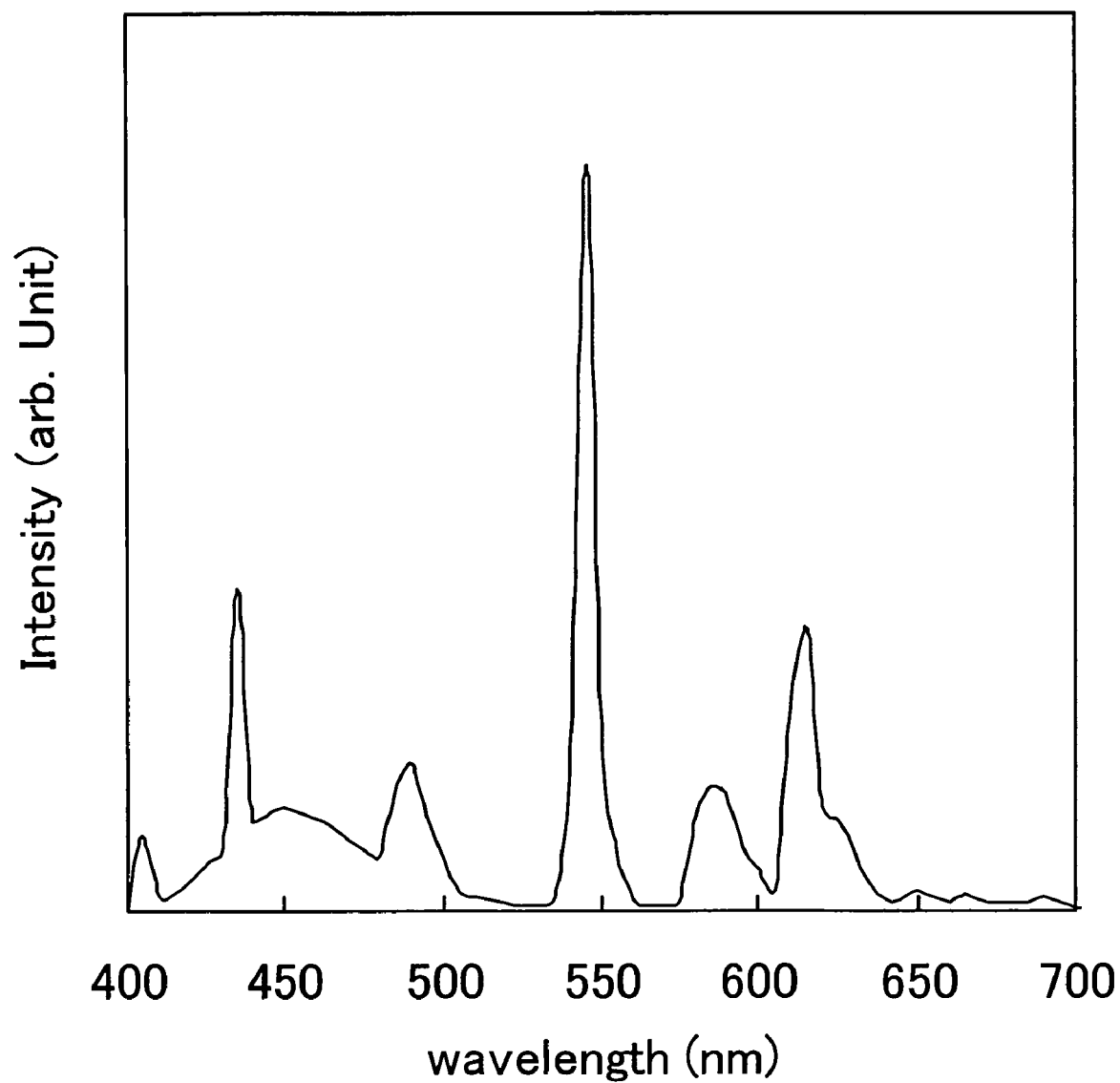
FIG. 3 is a chart showing an example of the spectrum of a three-peak type cold cathode fluorescent lamp.
Figure 4:
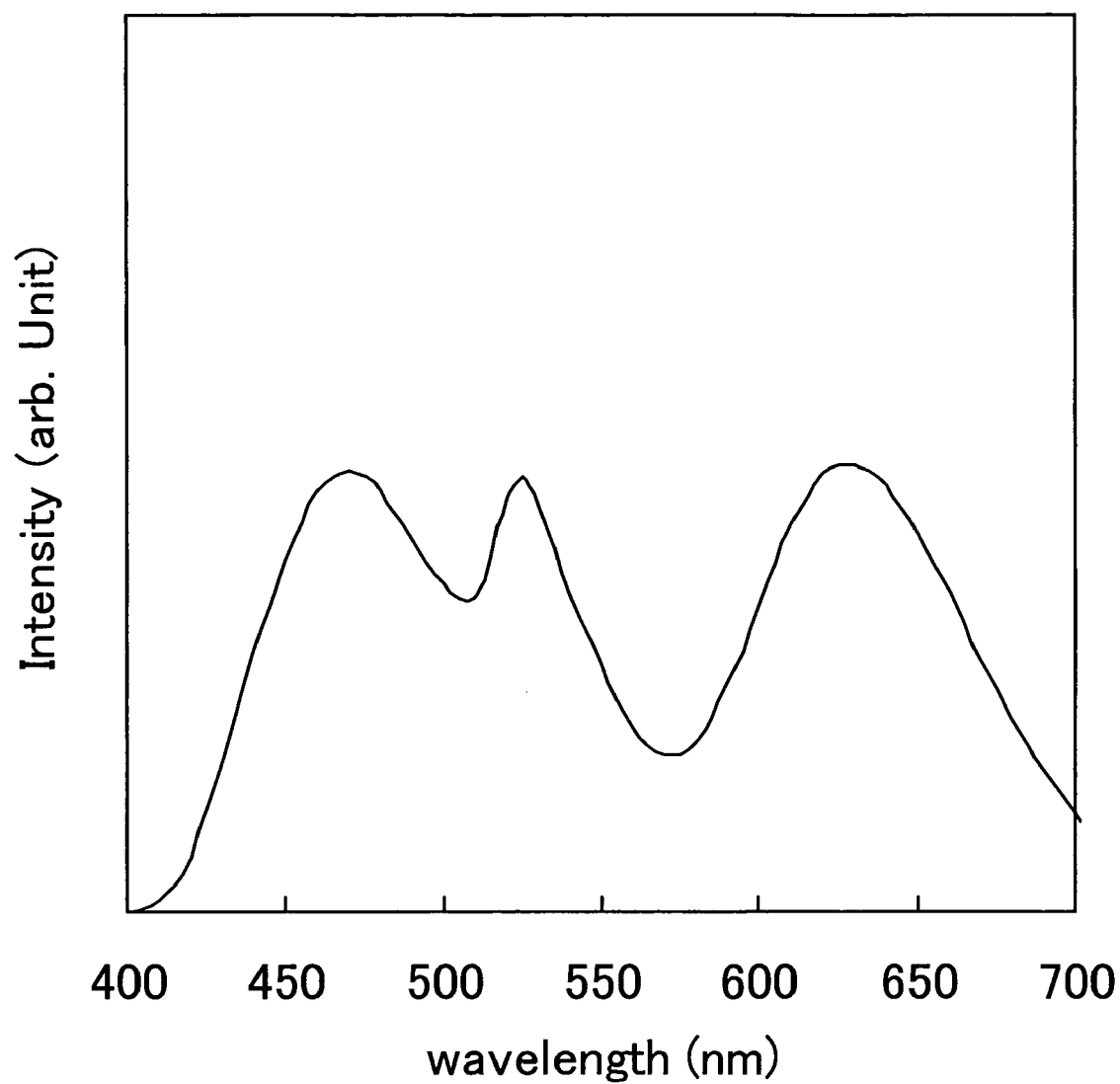
FIG. 4 is a chart showing an example of the spectrum of a three-peak type organic electroluminescence light source.
Figure 5:
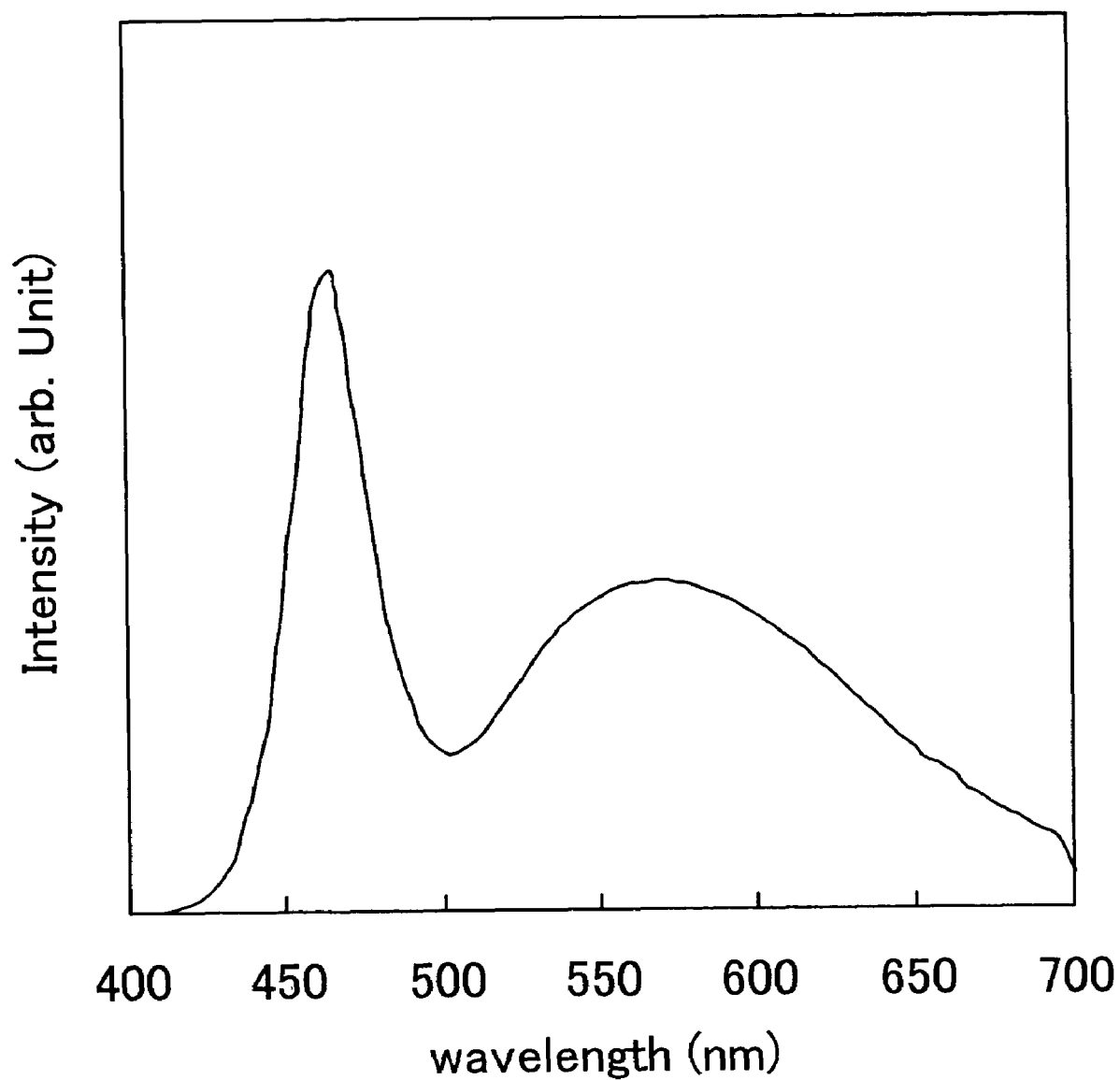
FIG. 5 is a chart showing an example of the spectrum of a two-peak type LED light source.

Reference numeral 1 denotes a transparent substrate; reference numeral 2, a black matrix; reference numeral 3, a transparent resin layer; reference numeral 4, a colored layer comprising non-photosensitive color paste; reference numeral 5, a colored layer comprising a photosensitive color resist; reference numeral 6, a reflective region; reference numeral 7, a transmissive region; reference numeral 8B, a blue picture element; reference numeral 8G, a green picture element; reference numeral 8R, a red picture element; reference numeral 9, an aperture region; and reference numeral 10, an over coat layer.

BEST MODE FOR CARRYING OUT THE INVENTION

A transflective liquid crystal display of the present invention comprises a liquid crystal layer having at least a light controlling function using an applied voltage, a pair of substrates disposed opposite to each other with the liquid crystal layer held therebetween, a reflection means using ambient light as a light source, and a backlight source.

In the liquid crystal display, it is important to provide a reflection plate partially formed on a surface of the substrate apart from the observation side, the surface of the substrate being in contact with the liquid crystal, a color filter having a transmissive region transmitting light emitted from the backlight source and a reflective region reflecting external light, which are provided in a region corresponding to one picture element of the color filter, and a three-peak type LED backlight source used as the backlight source disposed at the back of the substrate apart from the observation side. In the color filter, a single colored layer is formed in each picture element, the transmissive region and the reflective region in each picture element have different color characteristics.

By providing both the reflection means and the backlight source, a good display can be obtained even in an outdoor environment having strong ambient light and in a relatively dark indoor environment. Also, the reflection means is disposed on the surface of the substrate apart from the observation side, the surface of the substrate being in contact with the liquid crystal, thereby producing a clear image with neither blur due to parallax and nor color mixing. Furthermore, the color filter comprising the transmissive regions and the reflective regions having different color characteristics, and the three-peak type LED backlight source are provided to permit the achievement of the transflective liquid crystal display with excellent visibility, which is capable of performing both a transmissive display with color vividness and a bright reflective display.

In the transflective liquid crystal display of the present invention, the substrate having the reflection means formed thereon may be the color filter substrate or the substrate apart from the color filter. When a reflection layer is formed on the color filter substrate, in each picture element having a coloring agent formed therein, each region having the reflection layer formed therein is the reflective region, and each region without the reflection layer is the transmissive region. When the reflection layer is formed on the substrate apart from the color filter, a color filter picture element region corresponding to each region having the reflection layer of the substrate is the reflective region, and a color filter picture element region corresponding to each region without the reflection layer of the substrate is the transmissive region.

In the color filter used in the transflective liquid crystal display of the present invention, it is important that the transmissive regions and the reflective regions have different color characteristics. From the viewpoint of low-cost manufacture of the liquid crystal display, the color filter may be a color filter, i.e., an area-controlling system color filter, comprising picture elements of at least one color in each of which the same colored layer is formed in the transmissive region and the reflective region, and the reflective region has an aperture region, or a color filter, i.e., a thickness-controlling system color filter, comprising picture element of at least one color in each of which a transparent resin layer is disposed between the substrate and the colored layer in the reflective region, and the colored layers of the reflective region and the transmissive region have different thicknesses. A color filter using a combination of the area-controlling system and the thickness-controlling system within each picture element may be used. Alternatively, a color filter having a plurality of colored layers laminated in the transmissive region of one picture element may be used. As the plurality of the colored layers, different colored layers or the same colored layer may be used.

The same colored layer means that a pigment composition and a pigment-resin ratio by weight are the same, and the different colored layers mean that any one of the pigment composition and the pigment-resin ratio by weight is different.

In the color filter used in the present invention, all picture elements need not have the same color filter structure, and the picture elements having different color filter structures may be used.

In the color filter used in the present invention, the transmissive region and the reflective region in each of the picture elements of at least one color may have the same colored layer and the same thickness, and an aperture region may be formed in the reflective region. By forming the aperture region in each reflective region, the brightness of each reflective display can be improved, and the manufacturing cost can be decreased. The color of the regions having the aperture regions is not particularly limited, and the aperture regions may be formed in the picture elements of any one of red, green, and blue. However, in consideration of a characteristic difference between the black light source and environmental light, the color of the picture elements in each of which the aperture region is formed, and the ratio (referred to as an "aperture region ratio") of the aperture regions to the reflective regions are preferably determined to achieve target color characteristics and brightness. Specifically, the aperture region means a region in which the average transmittance in the visible region is 80% or more.

When the aperture regions are formed in the picture elements of a plurality of colors, the aperture region ratios are preferably set in the order of green>red¢blue. The aperture region ratio of the red picture element is substantially the same as that of the blue picture element. More specifically, the aperture region ratio of the green picture elements is preferably 10% to 50%, the aperture region ratio of the red picture elements is preferably 5% to 30%, and the aperture region ratio of the blue picture elements is preferably 30% or less. More preferably, the aperture region ratio of the green picture elements is 10% to 40%, the aperture region ratio of the red picture elements is 6% to 25%, and the aperture region ratio of the blue picture elements is 4% to 25%. When each of the aperture region ratios is smaller than the above range, a bright reflective display cannot be obtained, while each of the aperture region ratios is larger than the above range, a reflective display with color vividness cannot be obtained.

When the formation of the aperture regions deteriorates surface flatness to possibly disturb liquid crystal alignment, an over coat layer is preferably formed as a planarizing layer on the coloring agents. Examples of the over coat layer include an epoxy resin layer, an acryl epoxy resin layer, an acryl resin layer, a siloxane polymer layer, a polyimide layer, a silicon-containing polyimide layer, a polyimidosiloxane layer, and the like.

In the color filter used in the present invention, a transparent resin layer may be formed in the reflective region of each of the picture elements of at least one color on the substrate.

When the transparent resin layers are formed in the respective reflective regions, each of the reflective regions projects by an amount corresponding to the thickness of the transparent resin layer, and thus the transmissive regions are lower than that reflective regions. Namely, the substrate has an uneven surface. When a non-photosensitive color paste and/or a photosensitive color resist is coated on the substrate having the uneven surface, in leveling of a color coating composition, the colored layer in each transmissive region becomes thicker than that in each of the projecting reflective regions. In this way, leveling of the color coating composition can differentiate the color characteristics of the reflective regions from the color characteristics of the transmissive regions, to improve the brightness of the reflective display.

Specifically, the transparent resin layers used in the present invention have an average transmittance of 80% or more in the visible region. In consideration of a difference between the light sources, the thickness of the transparent resin layer formed in each of the reflective regions is selected to obtain desired characteristics such as the color purity, brightness, and color tones of the reflective regions and the transmissive regions. In leveling of the color coating composition, the difference in thickness between the colored layers formed in each reflective region and each transmissive region increases as the thickness of the transparent resin increases, and thus the effect of improving the brightness of the reflective regions increases. When the thickness of the transparent resin layers is excessively increased, (1) the surface unevenness of the color filter increases to adversely affect the liquid crystal alignment and thus deteriorate the display quality, and (2) the thickness of the colored layer in each reflective region cannot be easily controlled to increase color variations. Therefore, the thickness of the transparent resin layers is preferably 5 μm or less.

Although the color of the picture elements in each of which the transparent resin layer is formed is not particularly limited, and the transparent resin layers may be formed in the picture elements of any one of red, green and blue. In consideration of the characteristic difference between the backlight used and environmental light, the color is preferably determined to achieve the target color characteristics and brightness. The transparent resin layer is preferably formed in each green picture element to improve the color characteristics of the reflective regions because the bright of the reflective display can be improved. The transparent resin layer is more preferably formed in each blue picture element to improve the color characteristics of the reflective regions because the white balance of the reflective display can be improved.

In the color filter used in the present invention, the above-described two methods may be combined in each picture element. Namely, the color filter may contain picture elements of at least one color in each of which the transparent resin layer is disposed between the substrate and the colored layer in the reflective region, the colored layers formed in the reflective region and the transmissive region have different thicknesses, and the aperture region is formed in the colored layer in the reflective region.

Also, a plurality of colored layers may be laminated in the transmissive region of each of the picture elements of at least one color. This structure can decrease a chromaticity difference between the transmissive display and the reflective display. Also, the transmittance can be improved, as compared with a color filter having aperture regions formed in all picture elements. The color of the picture elements in each of which the colored layers are laminated is not particularly limited, and the colored layer may be laminated in each of the picture elements of any one of red, green and blue. However, in consideration of the characteristic difference between the backlight source and environmental light, the color the picture elements in each of which the colored layers are laminated is preferably determined so as to decrease the chromaticity difference between the reflective display and the transmissive display. Also, the area of the colored layers which are laminated in each transmissive region is preferably determined so as to decrease the chromaticity difference between the reflective display and the transmissive display. The coloring agents are preferably laminated in each of the transmissive regions so as to prevent the occurrence of space between the boundaries and an overlap of colors. Specifically, a preferable method comprises first coating a coloring agent only in the transmissive regions and then coating the same coloring agent in the transmissive regions and the reflective regions, or comprises first coating the same coloring agent in the transmissive regions and the reflective regions and then coating another coloring agent only in the transmissive regions.

With respect to the chromaticity difference $\delta$ between the chromaticity (x0, y0) of the transmissive regions and the chromaticity (x, y) of the reflective regions, the color filter preferably does not contain a picture element having the relation $\delta=(x-x0)^2+(y-y0)^2 \geq 1\times10^{-3}$, more preferably the relation $\delta=(x-x0)^2+(y-y0)^2 \geq 5\times10^{-4}$.

The chromaticity of the transmissive regions can be determined from a spectrum in microspectrophotometer measurement of the transmissive regions of the color filter. When each of the transmissive regions is divided into a plurality of planar parts by laminating a plurality of coloring agents, the spectrum of each part is measured, and area weighted average chromaticity is calculated. The chromaticity of the reflective regions is determined by squaring each of the spectra of the colored region and the transparent region in a reflective region at each wavelength, and calculating an area weighted average for the colored region and transparent region. Since the chromaticity is calculated with consideration of a difference between the light sources, the calculation is preferably performed by using any one of standard light source C, a two-peak type light source and a three-peak type light source for the transmissive regions, and light source D65 for the reflective regions. An example of the two-peak type LED light source is a LED light source using a combination of a blue LED and a yellow phosphor or a yellow-green phosphor for emitting white light. Examples of the three-peak type light source include a three-peak fluorescent lamp, a white LED light source comprising a combination of an ultraviolet LED and red, blue and green phosphors, a white LED light source comprising a combination of red, blue and green LEDs, an organic electroluminescence light source, and the like.

In the present invention, the transparent resin layers can be formed by using a photosensitive resist. As a photosensitive resin material, a material such as a polyimide resin, an epoxy resin, an acryl resin, an urethane resin, a polyester resin, a polyolefin resin, or the like can be used, and an acryl resin is preferably used. A photosensitive acryl resist generally has a composition containing at least an acryl polymer, acryl functional monomer or oligomer, and a photopolymerization initiator. Also, an acryl epoxy resist containing an epoxy monomer may be used. When the transparent resin layers are formed by using the photosensitive resist, in an exposure step of photolithography processing, the surface roundness and flatness of the transparent resin layers can be controlled by changing the distance between an exposure mask and the substrate on which the transparent resin layers are formed.

In the present invention, the transparent resin layers can also be formed by using non-photosensitive paste. As a non-photosensitive resin material, a material such as a polyimide resin, an epoxy resin, an acryl resin, an urethane resin, a polyester resin, a polyolefin resin, or the like can be used, and a polyimide resin is preferably used. When the transparent resin layers are formed by using non-photosensitive paste, the top surfaces of the transparent resin layers can be flattened, and the small-area transparent resin layers can be formed.

The transparent resin layers formed in the respective reflective regions may contain light scattering particles. When the transparent resin layers contain the light scattering particles, dazzle in a display due to a regular reflection component can be suppressed to achieve a good reflective display. Since the transparent resin layers are not formed in the transmissive regions, no light scattering occurs to permit the efficient use of the backlight. Examples of the light scattering particles include particles of inorganic oxides such as silica, alumina, titania, and the like, metal particles, particles of resins such as an acryl resin, a styrene resin, silicone, a fluorine-containing polymer, and the like. The light scattering particles having a particle diameter of 0.1 μm to 10 μm can be used. The light scattering particles more preferably have a particle diameter smaller than the thickness of the transparent resin layers because the transparent resin layers become flat.

In some cases, the formation of the transparent resin layers deteriorates the surface roughness to produce step differences between the surfaces of the transmissive regions and the reflective regions. Therefore, the over coat layer is preferably formed as a planarizing layer on the picture elements. Examples of the over coat layer include an epoxy layer, an acryl epoxy layer, an acryl layer, a siloxane polymer layer, a polyimide layer, a silicon-containing polyimide layer, a polyimidosiloxane layer, and the like.

The substrate on which the color filter is formed is not limited to the transparent substrate such as a glass or polymer film substrate, or the like, and the color filter may be formed on a driver element-side substrate. The pattern of the color filter is not particularly limited, and a stripe shape, an island shape, or the like may be used. Also, a fixed columnar spacer may be disposed on the color filter according to demand.

The picture elements are formed by a photolithography method, a printing method, an electrodeposition method, or the like, and the forming method is not particularly limited. In consideration of pattern formability, the photolithography method is preferably used.

Each of the color paste and color resist used in the present invention contains a coloring component and a resin component. As the resin component, a polyimide resin, an epoxy resin, an acryl resin, a urethane resin, a polyester resin, a polyolefin resin, or the like is preferably used.

The photosensitive color resist contains a coloring component and a resin component containing a photosensitive component sensitive to light. The type of the photosensitive color resist may be a positive type in which an irradiated resin portion becomes soluble in a developer, or a negative type in which an irradiated resin portion becomes insoluble in the developer. A negative resin is preferably used because the photosensitive component has high transparency in the visible region. As the resin component of the photosensitive color resist, a polyimide resin, an epoxy resin, an acryl resin, an urethane resin, a polyester resin, a polyolefin resin, or the like is preferably used.

The color filter of the present invention comprises the picture elements of at least the three colors including red, green and blue. As the coloring agents, any of general coloring agents such as an organic pigment, an inorganic pigment, a dye, and the like may be used. Furthermore, various additives such as an ultraviolet absorber, a dispersant, and the like may be added. As the dispersant, any one of a wide range of agents such as a surfactant, a pigment intermediate, a dye intermediate, a polymer dispersant, and the like may be used. Furthermore, various additives may be further added for improving a coating property and a leveling property.

Examples of a pigment include Pigment Red (PR-) 2, 3, 9, 22, 38, 81, 97, 122, 123, 144, 146, 149, 166, 168, 169, 177, 179, 180, 190, 192, 206, 207, 209, 215, 216, 224, 242, 254, and 266; Pigment Green (PG-) 7, 10, 36, 37, 38, and 47; Pigment Blue (PB-) 15 (15:1, 15:2, 15:3, 15:4, 15:6), 16, 17, 21, 22, 60, and 64; Pigment Yellow (PY-) 12, 13, 14, 17, 20, 24, 83, 86, 93, 94, 95, 109, 110, 117, 125, 129, 137, 138, 139, 147, 148, 150, 153, 154, 155, 166, 173, 180, and 185; Pigment Violet (PV-) 19, 23, 29, 30, 32, 33, 36, 37, 38, 40, and 50; Pigment Orange (PO-) 5, 13, 17, 31, 36, 38, 40, 42, 43, 51, 55, 59, 61, 64, 65, and 71. These pigments may be used singly or in a combination of at least two pigments.

The pigment may be surface-treated by rosin treatment, acidified treatment, basified treatment, pigment derivative treatment or the like according to demand.

PR (Pigment Red), PY (Pigment Yellow), PV (Pigment Violent; and PO (Pigment Orange) are symbols in the color index (C. I.: issued by The Society of Dyers and Colourists), and C. I. is officially added at the top (for example, C. I. PR254). These symbols define the standards of dyes and dyeing, and each of the symbols defines a specified standard dye and its color. In the description below, as a rule, C. I. is omitted (for example, C. I. PR254 is shown as PR254).

As a method for coating the non-photosensitive color paste or photosensitive color resist, a dipping method, a roll coater method, a spin coating method, a die coating method, a combined method comprising die coating and spin coating, a wire bar coating method, or the like is preferably used.

An example of the method for forming the transparent resin layers by using the non-photosensitive paste will be described below. First, the non-photosensitive paste is coated on the transparent substrate and then dried (semicured) by hot plate heating, oven heating, or vacuum drying. Then, a positive photoresist is coated on the semicured layer, and then dried (pre-baked) by heating. After pre-baking, mask exposure and alkali development are performed to dissolve the photoresist in a solvent, forming the transparent resin layers which are then cured by heating.

An example of the method for forming the transparent resin layers by using the photosensitive resin will be described below. First, the photosensitive paste is coated on the transparent substrate and then dried (pre-baked) by hot plate heating, oven heating, or vacuum drying. After pre-baking, mask exposure, alkali development and heat curing are performed to obtain the transparent resin layers.

An example of the method for forming the colored picture elements will be described below. First, for example, the non-photosensitive color paste is coated on the transparent substrate or the transparent substrate having the transparent resin layers formed in the reflective regions of the picture elements, and then heat-dried (semicured) by a hot plate, an oven, or vacuum drying. Then, a positive photosensitive resist is coated on the semicured layer and heat-dried (pre-baked). After pre-baking, mask exposure, alkali development and heat curing are performed.

The present invention is described above with reference to the example in which the colored layers are formed to different thicknesses by forming the transparent resin layers in the reflective regions and by leveling the color coating composition. However, another method may be used. For example, the curing thickness of each colored layer comprising a photosensitive color resist can be changed by changing an exposure amount in mask exposure in a photolithography process. Although the use of an acryl resin as the resin component is described, the photosensitive color resist of the present invention is not limited to this. In photolithography of the photosensitive color resist, with a sufficient amount of exposure, photocrosslinkage of the photosensitive color resist proceeds, and thus an exposed portion becomes insoluble in the developer. An unexposed portion is soluble in the developer because photocrosslinkage of the acryl resin does not proceed. On the other hand, with an exposure insufficient for curing the photosensitive resin, photocrosslinkage of the acryl resin does not sufficiently proceed, and thus an exposed portion is partially soluble in the developer. Therefore, the thickness of the photosensitive resin can be controlled by controlling the exposure.

As a method for controlling the exposure, a method using a semi-transparent photomask, or a method using a photomask having slits or dots may be used. The semi-transparent photomask has a semi-transparent region having a transmittance of 0 and more and less than 100%. By using the semi-transmitting photomask, the thickness can be controlled by using a large-exposure portion and a small-exposure portion. A slit photomask has a slit having a width of 20 μm or less and formed in a light shielding portion of the photomask so that an average quantity of light transmitted through the slits per unit area is calculated to control the exposure. A dot photomask has at least one circular, elliptic, square, rectangular, rhombic, or trapezoidal dot having an area of 400 μm$^2$ or less and formed in a light shielding portion so that an average quantity of light transmitted through slits per unit area is averaged to control the exposure.

The transflective liquid crystal display of the present invention comprises a combination of the color filter having the picture elements of at least the tree colors including red, green and blue, and the three-peak type backlight source.

In the present invention, it is important that the backlight source is the three-peak type light source, and that a side peak due to an impurity component other than the three peaks corresponding to the red, green and blue colors is absent or small to produce a sharp spectral shape. Any of general light sources such as a cold cathode fluorescent lamp, a hot cathode fluorescent lamp, a light emitting diode (LED), an organic electroluminescence light source, an inorganic electroluminescence light source, a planar fluorescent lamp, a metal halide lamp, and the like may be used as long as the light source satisfies the above condition. However, it was found that the three-peak type LED light source has a significant effect on the object of the present invention to achieve the high color reproducibility of the transmissive display and the excellent characteristics (color reproducibility and brightness) of the reflective display.

As the three-peak type LED light source, a white light source comprising a combination of RGB light emitting diodes, or a white light source comprising a combination of an ultraviolet light emitting diode and RGB phosphors may be used. For example, a chip LED "GM1WA80350A" produced by Sharp Corporation may be used. An example of the white LED light source comprising a combination of an ultraviolet light emitting diode and RGB phosphors is a white LED produced by Toyoda Gosei Co., Ltd. (Nikkei Electronics, 2002, Vol. 2-25).

In consideration of a difference between the light sources, color characteristics of the picture elements are preferably designed by using the backlight source for the transmissive regions and the light source D65 close to sunlight (natural light) for the reflective regions.

In the transflective liquid crystal display of the present invention, a driving system and display system are not limited. An active matrix system, a passive matrix system, a TN mode, a STN mode, an ECB mode, an OCB mode, and the like may be used for the liquid crystal display. Also, the configuration of the liquid crystal display, for example, the number of polarization plates, the position of a scatterer, and the like, is not particularly limited.

An example of the method for manufacturing the color filter used in the present invention will be described.

A color paste comprising at least a polyimide precursor (polyamic acid), a coloring agent, and a solvent is coated on the transparent substrate and then dried by air drying, heat drying or vacuum drying to form a polyamic acid colored film. Heat drying is preferably performed by using an oven or a hot plate in the range of 50° C. to 180° C. for 1 minute to 3 hours. Then, the polyamic acid colored film obtained as described above is patterned by usual wet etching. First, a positive photoresist is coated on the polyamic acid colored film to form a photoresist film. Then, a mask having a picture element pattern of each color or a mask having a pattern for forming apertures as occasion demands is placed on the photoresist film, and then irradiated with ultraviolet light using an exposure apparatus. After exposure, the photoresist film and the polyamic acid colored film are simultaneously etched with an alkali developer for positive photoresist. After etching, the unnecessary photoresist film is removed.

Then, the polyamic acid colored layer is heat-treated to be converted to a polyimide colored film. The heat treatment is performed continuously or stepwisely in air, a nitrogen atmosphere or vacuum at 150° C. to 350° C., preferably 180' C. to 250' C., for 0.5 to 5 hours.

When the color filter substrate having the transparent resin layers formed in the respective reflective regions is formed, a non-photosensitive paste comprising polyamic acid and a solvent is coated over the entire surface of the transparent substrate, and then heat-dried by using a hot plate in the range of 60° C. to 200' C. for 1 minute to 60 minutes. Next, a positive photoresist is coated on the polyamic acid film obtained as described above, and then heat-dried by using a hot plate in the range of 60° C. to 150° C. for 1 minute to 30 minutes. Then, the intended pattern is baked by ultraviolet irradiation using an exposure apparatus, followed by an alkali development to obtain the transparent resin layers in a desired pattern at a desired position. The resultant transparent resin layers are heat-cured at 200° C. to 300° C. Next, the colored layers are formed in each of the picture elements in each of which the transparent resin layer is formed in the reflective region, the colored layers in the transmissive and reflective regions in each picture element having different thicknesses due to the transparent resin layer formed in the reflective region. A photosensitive color resist comprising a photosensitive acryl resin comprising at least an acryl polymer, an acryl polyfunctional monomer, and a photopolymerization initiator, a coloring agent and a solvent is coated and then dried by air drying, heat drying or vacuum drying to form a photosensitive acryl colored film. The heat drying is preferably performed by using an oven, a hot plate, or the like in the range of 60° C. to 200° C. for 1 minute to 3 hours. Then, the photosensitive acryl colored film is irradiated in the form of a pattern with ultraviolet rays using an exposure apparatus through a photomask. After exposure, the photosensitive acryl colored film is etched with an alkali developer.

The above-described process is performed for the picture elements of each of red, green and blue (a black matrix as occasion demands), and if required, the over coat layer for planarization and a transparent conductive film of ITO or the like are deposited to form the color filter for the liquid crystal display.

Next, an example of the transflective liquid crystal display using the color filter will be described. First, a transparent protective film is formed on the color filter, and a transparent electrode comprising an ITO film or the like is formed on the protective film. Next, the color filter substrate is opposed to a transflective substrate on which a transflective film having a metallized film pattern, a transparent insulating film formed on the transfective film, and a transparent electrode comprising an ITO film or the like are formed. Also, a liquid crystal alignment film provided on each of the substrates and subjected to rubbing for liquid crystal alignment, and a spacer for maintaining the cell gap are interposed between both substrates opposed to each other and sealed together. Besides the reflection layer and the transparent electrode, light diffusion projections, thin-film transistor (TFT) devices or thin-film diode (TFD) devices, scanning lines and signal lines are provided on the transflective substrate to form a TFT liquid crystal display or TFD liquid crystal display. Next, a liquid crystal is injected through an injection hole provided at the sealed portion, and then the injection port is sealed. Next, a driver IC and the like are mounted to complete a module.

Next, an example of the method for forming the backlight source used in the present invention will be described.

For the backlight source using a LED, LED devices are arranged on a substrate on which wiring is patterned for applying a necessary voltage, a driver IC is mounted on the substrate, and then a diffusion plate, a light guide plate, a prism sheet, a guide rod, and the like are appropriately combined to complete the backlight source.

For a three-peak type fluorescent lamp, a fluorescent slurry comprising an inorganic phosphor corresponding to each of the red, green and blue colors, an organic solvent such as butyl acetate, and a binder resin such as nitrocellulose is coated on the inner wall of a cylindrical glass tube by vacuum suction, and then heat-treated at a temperature of 400° C. to 650° C. for 3 minutes to 20 minutes to bake the phosphor and remove gases. Next, the glass tube is evacuated to a vacuum of $10^{-2}$ to $10^{-5}$ Torr, and an argon gas or a mixture of argon gas and neon gas, krypton gas, xenon gas, or the like is sealed in the glass tube. A mercury dispenser previously provided on an electrode portion is heated with a radio frequency wave to diffuse mercury in the tube. Finally, aging is performed for several hours to complete the three-peak type fluorescent lamp. The thus-obtained three-peak fluorescent lamp, a diffusion plate, a light guide, a prism sheet, a guide rod, and the like are appropriately combined to complete the backlight source.

For the backlight source using organic electroluminescence, first a positive photoresist is coated to a desired thickness on an ITO glass substrate by spin coating. The resultant coated film is patterned by exposure through a mask, subjected to development to form a pattern, and then cured. Next, a thin-film layer pattern containing a hole transport layer and an emitting layer is formed by vacuum deposition, and then an electron transport layer and aluminum are deposited to a predetermined thickness. The substrate is bonded to a sealing plate with a curable epoxy resin and sealed therewith to complete the organic electroluminescence light source.

EXAMPLES

<Measurement Method>

Transmittance and color coordinates: A glass substrate having an ITO film deposited thereon under the same deposition conditions as those used for a color filter was measured as a reference by using OTSUKA ELECTRONICS Co., Ltd., Multi Channel Photo Detector "MCPD-2000".

The transmissive region chromaticity can be determined from a spectrum obtained in measurement of the transmissive regions of the color filter using a microspectrophotometer or the like. When each of the transmissive regions is divided into a plurality of planar parts by laminating a plurality of coloring agents, the spectrum of each part is measured, and area weighted average chromaticity is calculated. The reflective region chromaticity is determined by squaring each of the spectra of the colored region and transparent region in a reflective region at each wavelength, and calculating an area weighted average for the colored region and transparent region.

Although the present invention will be described in detail below with reference to examples, the present invention is not limited to these examples.

In each of the examples and comparative examples below, the ratio of a reflection plate (reflective region) to the aperture of each picture element was 50% unless otherwise specified. Also, a transparent resin layer was formed in the reflective region of each picture element.

Example 1

A. Formation of Polyamic Acid Solution 95.1 g of 4,4'-diaminodiphenyl ether and 6.2 g of bis(3-aminopropyl)tetramethyl disiloxane were charged together with 525 g of γ-butyrolactone and 220 g of N-methyl-2-pyrrolidone, and 144.1 g of 3,3',4,4'-biphenyltetracarboxylic acid dianhydride was added to the resultant mixture. After reaction at 70° C. for 3 hours, 3.0 g of phthalic anhydride was added to the reaction solution, followed by further reaction at 70° C. for 2 hours to obtain a 25 wt % solution of polyamic acid (PAA).

B. Synthesis of Polymer Dispersant 161.3 g of 4,4'-diaminobenzanilide, 176.7 g of 3,3'-diaminodiphenyl sulfone and 18.6 g of bis(3-aminopropyl)tetramethyl disiloxane were charged together with 2667 g of γ-butyrolactone and 527 g of N-methyl-2-pyrrolidone, and 439.1 g of 3,3',4,4'-biphenyltetracarboxylic acid dianhydride was added to the resultant mixture. After reaction at 70° C. for 3 hours, 2.2 g of phthalic anhydride was added to the reaction solution, followed by further reaction at 70° C. for 2 hours to obtain a 20 wt % solution of polyamic acid (PAA) as a polymer dispersant (PD).

C. Formation of Non-photosensitive Color Paste 4.5 g of, Pigment Red PR254, 22.5 g of the polymer dispersant (PD), 42.8 g of γ-butyrolactone and 20.2 g of 3-methoxy-3-methyl-1-butanol were charged together with 90 g of glass beads, and the resultant mixture was dispersed by a homogenizer for 5 hours at 7000 rpm. Then, the glass beads were filtered off to obtain a 5% dispersion solution (RD) comprising PR254.

Then, a solution obtained by diluting 8.0 g of the polyamic acid solution (PAA) with 50.0 g of γ-butyrolactone was added and mixed with 25.5 g of the dispersion solution (RD) to obtain red color paste (RPI-1). Similarly, each of red paste (R-1, R-2, R-3, R-4, R-5, and R-6), green paste (GPI-1, G-1, G-2, G-3, G-4, and G-5) and blue paste (BPI-1, B-1, B-2, B-3, B-4, and B-5) shown in Table 1 was obtained.

D. Formation of Non-photosensitive Paste (Used for Transparent Resin Layers)

16.0 g of the polyamic acid solution (PAA) was diluted with 34.0 g of γ-butyrolactone to obtain non-photosensitive transparent paste (TPI-1).

E. Formation of Photosensitive Color Resist 35.2 g of Pigment Red PR254 was charged together with 200 g of 3-methyl-3-methoxybutanol, and the resultant mixture was dispersed by a homogenizer at 7000 rpm for 5 hours. The glass beads were filtered off to obtain a dispersion solution. On the other hand, 130.00 g of cyclopentanone was added to 35.00 g of an acryl copolymer solution (DAICEL Chemical Industries, LTD. "SAIKUROMA P, ACA-250", 43 wt % solution), 15.00 g of pentaerythritol tetramethyl acrylate as a polyfunctional monomer, and 7.50 g of "IRGACURE 369" as a photopolymerization initiator to obtain a 20 wt % solution of photosensitive acryl resin (AC-1). Then, 20 g of the red dispersion solution was added to 38.5 g of the photosensitive acryl resin solution (AC-1) to form a red resist (RAC-1). Similarly, a red resist (RAC-2), green resists (GAC-1 and GAC-2), blue resists (BAC-1 and BAC-2) shown in Table 1 were obtained.

TABLE 1

| Paste No. | Pigment Composition (wt %) | Pigment/Resin (ratio by weight) |
|---|---|---|
| RPI-1 | PR254 = 100 | 28/72 |
| GPI-1 | PG36/PY138 = 55/45 | 42/58 |
| BPI-1 | PB15:6/PV23 = 96/4 | 35/65 |
| RAC-1 | PR254 = 100 | 28/72 |
| GAC-1 | PG36/PY138 = 55/45 | 42/58 |
| BAC-1 | PB15:6/PV23 = 96/4 | 35/65 |
| R-1 | PR209/PO38 = 85/15 | 33/67 |
| R-2 | PR209/PO38 = 70/30 | 25/75 |
| R-3 | PR209/PO38 = 30/70 | 17/83 |
| R-4 | PR254/PR122 = 85/15 | 11/89 |
| R-5 | PR254 = 100 | 23/77 |
| R-6 | PR254/PR138 = 85/15 | 14/86 |
| G-1 | PG36/PY138 = 75/25 | 17/83 |
| G-2 | PG36 = 100 | 32/68 |
| G-3 | PG36/PY138 = 85/25 | 26/74 |
| G-4 | PG36/PY138 = 70/30 | 40/60 |
| G-5 | PG36/PY138 = 55/45 | 15/85 |
| B-1 | PB15:6 = 100 | 17/83 |
| B-2 | PB15:6/PV23 = 93/7 | 12/88 |
| B-3 | PB15:6 = 100 | 8/92 |
| B-4 | PB15:6 = 100 | 25/75 |
| B-5 | PB15:6/PV23 = 96/4 | 12/88 |

F. Formation and Evaluation of Colored Film

The red paste (RPI-1) was coated by a spinner on a glass substrate having a black matrix pattern formed thereon. The coating film was dried at 120° C. for 20 minutes, and then a positive photoresist (TOKYO OHKA KOUGYO CO., LTD. "OFPR-800") was coated on the resultant film and dried at 90° C. for 10 minutes. The resultant coating film was exposed to light by using Canon Inc. "Proximity Exposure "PLA-501F" through a chromium photomask with a strength of 60 mJ/cm$^2$ (strength of ultraviolet light at 365 nm). The photomask used had an aperture ratio (aperture region ratio) of 11% in the reflective regions. After exposure, the substrate was dipped in a developer comprising a 2.0% aqueous solution of tetramethylammonium hydroxide to simultaneously perform development of the photoresist and-etching of the colored film of polyimide precursor. After etching, the unnecessary photoresist layer was removed with acetone. Furthermore, the colored film of a polyamide precursor was heat-treated at 240° C. for 30 minutes to convert the polyamide precursor to polyimide. The coating thickness in each of a transmissive region and a reflective region after heat treatment was 1.2 μm, and the chromaticity (x, y) of the transmissive regions, which was measured by using standard light source C, was (0.567, 0.310).

Next, the color paste (GPI-1) was coated by a spinner, and then photolithography was performed by the same method as that used for the red picture elements except that a photomask having an aperture ratio of 27% in a reflective region, to form colored layers. The thickness of the green colored layer in each of the transmissive regions and the reflective regions was 1.2 μm, and the chromaticity (x, y) of the transmissive regions, which was measured by using standard light source C, was (0.321, 0.541).

Figure 10:
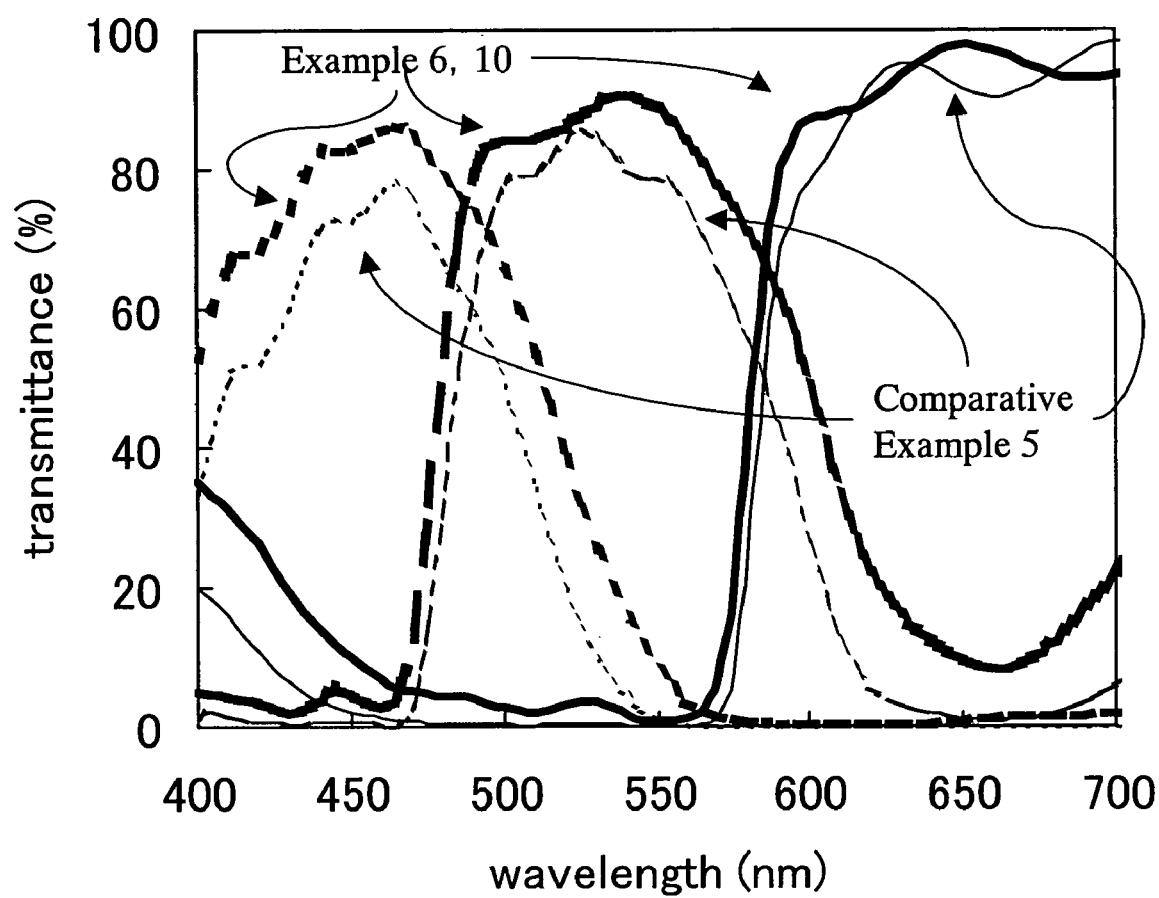
FIG. 10 is a chart showing a spectrum of a transmissive region in each of Examples 1 and 5 (combination with a three-peak type LED) and a spectrum of a transmissive region in Comparative Example 1 (combination with a two-peak type LED)
Figure 11:
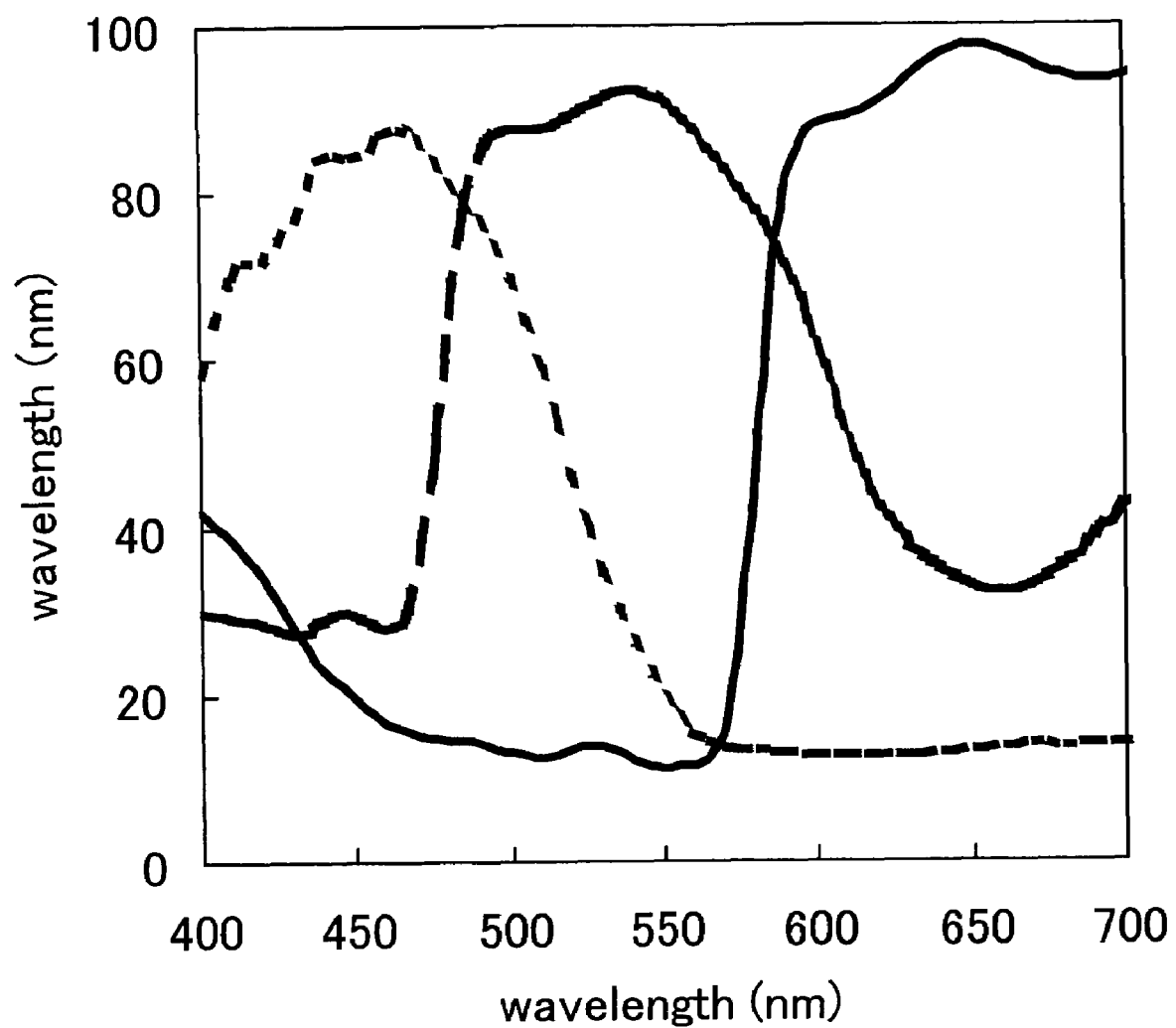
FIG. 11 is a chart showing a spectrum of a reflective region in Example 1 (combination of an area-controlling system color filter and a three-peak type LED)

Next, the color paste (BPI-1) was coated by a spinner, and then photolithography was performed by the same method as that used for the red picture elements except that a photomask having an aperture ratio of 13% in a reflective region, to form colored layers. The thickness of the blue colored layer in each of the transmissive regions and the reflective regions was 1.2 μm, and the final chromaticity (x, y) of the transmissive regions, which was measured by using standard light source C, was (0.138, 0.127). Then, an over coat layer (JSR Corporation, "Optomer SS6500/SS0500") was deposited to a thickness of 2 μm on the picture element layer. Then, an ITO film was deposited to a thickness of 0.1 μm by sputtering on the over coat layer. For the thus-obtained color filter substrate, the spectrum of each of the central picture element and the four corner picture elements of the substrate was measured. The spectra measured at the respective measurement portions were averaged. FIG. 10 shows the resulting spectrum (transmissive region spectrum), and FIG. 11 shows the spectrum (reflective region spectrum of an area-controlling system color filter) obtained from an area weighted average of the spectra of the colored region and the transparent region of a reflective region.

G. Formation of Backlight Source

A two-peak type white LED "NSSW440" produced by NICHIA Corporation was disposed on a substrate having a wiring pattern, and driver IC was mounted on the substrate. Then, a reflection plate, a light guide, a diffusion plate, and a prism sheet were combined to the substrate to form a backlight source. Similarly, a backlight source was formed by using each of a three-peak type white LED (ultraviolet LED+RGB phosphors), and a three-peak type white LED (RGB three chip LEDs).

Each of $Y_2O_3$:Eu, $LaPO_4$:Tb, Ce and $BaMg_2Al_{16}O_{27}$:Eu used as the red, green and blue phosphors, respectively, was mixed with butyl acetate and nitrocellulose to prepare a fluorescent slurry. Then, the fluorescent slurry was coated on the inner surface of a cylindrical glass tube having a diameter of 2 mm, and heat-treated at 550° C. for 5 minutes to bake the phosphor. The glass tube was evacuated to a vacuum of $10^{-4}$ Torr, and then a mixed gas containing argon gas and xenon gas was sealed in the tube. Then, mercury was diffused in the tube to form a three-peak type fluorescent lamp. The thus-formed three-peak type fluorescent lamp was combined with a reflection plate, a light guide, a diffusion plate, and a prism sheet to form a backlight source.

Furthermore, an organic electroluminescence light source was formed as follows. A positive photoresist (TOKYO OHKA KOUGYO CO., LTD. "OFPR-800") was coated to a thickness of 3 μm on an ITO glass substrate (GEOMATEC Co., Ltd.) by a spin coating method. The resultant coating film was exposed to light in the form of a pattern-through a photomask, and then subjected to development to form a photoresist pattern. After the development, the pattern was cured at 160° C. Next, a thin-film layer including an emitting layer was formed by a vacuum deposition method in a resistance wire heating system through a shadow mask. In vacuum deposition, the degree of vacuum was $2\times10^{-4}$ Pa, and the substrate was rotated with respect to a deposition source. First, 15 nm of copper phthalocyanine and 60 nm of N,N'-diphenyl-N,N'-bis(1-naphthyl)-1,1'-diphenyl-4,4'-diamine (α-NPD) were deposited over the entire surface of the substrate to form a hole transport layer. Next, tris(8-quinolinolato) aluminum (III) (Alq3) serving as a host material, 2,3,5, 6-1H,4H-tetrahydro-9-(2'-benzothiazolyl)quinolizino [9,9a, 1-gh]cumarin (C545) serving as a dopant material were co-deposited so that the dopant content was 1.0% by weight to form a green light emitting layer pattern. Next, the shadow mask was shifted by a length corresponding to one pitch, and Alq3 as a host material and 4-(dicyanomethylene)-2-methyl-6-(1,1,7,7-tetramethyldurolysyl-9-enyl)-4H-pyrane (DCJT) serving as a guest material were co-deposited so that the dopant content was 2.0% by weight to form a red light emitting layer pattern. Furthermore, the shadow mask was shifted by a length corresponding to one pitch, and 4,4'-bis(2,2'-diphenylvinyl)diphenyl (DPVBi) was deposited to a thickness of 20 nm to form a blue light emitting layer pattern. Next, 2,9-dimethyl-4,7-diphenyl-1,10-phenanthroline was deposited to a thickness of 45 nm over the entire surface of the substrate to form an electron transport layer. Then, the thin-film layer was exposed to lithium vapor for doping (0.5 nm in terms of thickness). Next, aluminum used for a counter electrode was deposited to a thickness of 400 nm. The substrate on which the counter electrodes was formed was removed from the deposition apparatus, maintained for 20 minutes under a reduced-pressure atmosphere created by a rotary pump, and then transferred to an argon atmosphere at a dew point –100° C. or less. In the low-humidity atmosphere, the substrate and a sealing plate were bonded together with a curing epoxy resin.

FIGS. 1 to 5 respectively show the spectra of the three-peak type light sources and the two-peak type LED formed as described above.

Example 2

A color filter substrate was formed by the same method as in Example 1 except that photomasks having aperture region ratios of 14%, 43% and 18% were used for photolithography of red, green and blue picture elements, respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 1

A color filter-substrate was formed by the same method as in Example 1 except that a colored film of each of red, green and blue picture elements was deposited to a thickness of 1.8 μm, and photomasks having aperture region ratios of 14%, 40% and 17% were for photolithography of red, green and blue picture elements, respectively. As a result of measurement of the chromaticity of the transmissive region of each of the red, green, and blue picture elements by using standard light source C, the degrees of chromaticity (x, y) of the red, green, and blue picture elements were (0.622, 0.328), (0.298, 0.581), and (0.135, 0.099), respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged. FIG. 10 shows the spectrum (transmissive region spectrum) obtained in Comparative Example, and the spectrum obtained in Example 1.

Table 2 show the reflection region chromaticity of the colored films measured with light source D65 and the transmissive region chromaticity measured with a three-peak type LED light source (ultraviolet LED+RGB phosphors) in each of the Examples 1 and 2, and the reflective region chromaticity of the colored films measured with light source D65 and the transmissive region chromaticity measured with a two-peak type LED light source in Comparative Example 1.

TABLE 2

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Example 1 | R | 0.618 | 0.294 | 32.4 | 60% | Three-peak type LED (UV-LED + RGB phosphors) | R | 0.519 | 0.332 | 27.5 | 23% (+52%) | 36.9 |
| | G | 0.271 | 0.596 | 62.0 | | | G | 0.302 | 0.454 | 64.3 | | |
| | B | 0.137 | 0.165 | 20.1 | | | B | 0.195 | 0.170 | 18.9 | | |
| | W | 0.336 | 0.341 | 38.2 | | | W | 0.320 | 0.330 | 36.9 | | |
| Example 2 | R | 0.618 | 0.294 | 32.4 | | | R | 0.497 | 0.332 | 29.8 | 15% | 41.3 (+12%) |
| | G | 0.271 | 0.596 | 62.0 | | | G | 0.306 | 0.409 | 70.8 | | |
| | B | 0.137 | 0.165 | 20.1 | | | B | 0.211 | 0.192 | 23.2 | | |
| | W | 0.336 | 0.341 | 38.2 | | | W | 0.320 | 0.323 | 41.3 | | |
| Comp. Example 1 | R | 0.630 | 0.349 | 23.4 | 60% | Two-peak type LED | R | 0.496 | 0.331 | 27.7 | 15% | 36.9 |
| | G | 0.333 | 0.576 | 57.3 | | | G | 0.299 | 0.409 | 63.2 | | |
| | B | 0.132 | 0.090 | 8.6 | | | B | 0.221 | 0.194 | 19.8 | | |
| | W | 0.336 | 0.341 | 29.8 | | | W | 0.324 | 0.325 | 36.9 | | |

*1)(Improvement over Comparative Example)

In comparison between the color characteristics of a combination of the color filter of Example 1 and a backlight source and a combination of the color filter of Comparative Examples 1 and a backlight source, both combinations equal in the color reproducibility range with the transmissive region chromaticity and brightness with the reflective region chromaticity. However, the range of color reproducibility in the reflective regions of the color filter of Example 1 is 52% higher than that of Comparative Example 1. In comparison between the color characteristics of a combination of the color filter of Example 2 and a backlight source and a combination of the color filter of Comparative Example 1 and a backlight source, both combination are equal in the color reproducibility range with the transmissive region chromaticity and the color reproducibility range with the reflective region chromaticity. However, brightness of the reflective regions of the color filter of Example 2 is 12% higher than that of Comparative Example 1.

In comparison between the display characteristics of a liquid crystal display comprising the color filter of each of Examples 1 and 2 and a three-peak type LED light source (ultraviolet LED+RGB phosphors) and a liquid crystal display comprising the color filter of Comparative Example 2 and a two-peak type LED light source, the liquid crystal displays are equal in the color vividness of a transmissive display. Although the liquid crystal displays of Example 1 and Comparative Example 1 are equal in brightness of a reflective display, the liquid crystal display of Example 1 exhibits higher color vividness and higher visibility. In comparison between the liquid crystal displays of Example 2 and Comparative Example 1, both liquid crystal display are equal in the color reproducibility range in a reflective display. However, the liquid crystal display of Example 2 exhibits higher brightness and higher visibility even in the dark.

Example 3

A color filter substrate was formed by the same method as in Example 1 except that a colored film of each of red, green and blue picture elements was deposited to a thickness of 1.1 μm, and photomasks having aperture region ratios of 10%, 27% and 10% were used for photolithography of red, green and blue picture elements, respectively. As a result of measurement of the transmissive region chromaticity of each of the red, green and blue picture elements by using standard light source C, the degrees of chromaticity (x, y) of the red, green and blue picture elements were (0.551, 0.305), (0.324, 0.531), and (0.139, 0.135), respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Example 4

A color filter substrate was formed by the same method as in Example 3 except that photomasks having aperture region ratios 14%, 43% and 19% were used for photolithography of red, green and blue picture elements, respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Table 3 shows the reflective region chromaticity of the colored films measured with light source D65 and the transmissive region chromaticity measured with a three-peak type LED light source (RGB chip LEDs) in each of Examples 3 and 4, and the reflective region chromaticity of the colored films measured with light source D65, and the transmissive region chromaticity measured with a two-peak type LED light source in Comparative Example 2.

TABLE 3

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Example 3 | R | 0.648 | 0.287 | 31.5 | 60% | Three-peak type LED (RGB -LED) | R | 0.526 | 0.332 | 27.5 | 26% (+73%) | 36.9 |
| | G | 0.255 | 0.574 | 62.3 | | | G | 0.304 | 0.454 | 66.1 | | |
| | B | 0.130 | 0.184 | 22.1 | | | B | 0.181 | 0.157 | 17.2 | | |
| | W | 0.337 | 0.342 | 38.6 | | | W | 0.319 | 0.328 | 36.9 | | |

TABLE 3-continued

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1 | Brightness(Y value of W)*1 |
| Example 4 | R | 0.648 | 0.287 | 31.5 | | | R | 0.496 | 0.331 | 30.5 | 15% | 42.5 (+15%) |
| | G | 0.255 | 0.574 | 62.3 | | | G | 0.307 | 0.410 | 72.3 | | |
| | B | 0.130 | 0.184 | 22.1 | | | B | 0.211 | 0.196 | 24.9 | | |
| | W | 0.337 | 0.342 | 38.6 | | | W | 0.320 | 0.323 | 42.5 | | |
| Comp. Example 1 | R | 0.630 | 0.349 | 23.4 | 60% | Two-peak type LED | R | 0.496 | 0.331 | 27.7 | 15% | 36.9 |
| | G | 0.333 | 0.576 | 57.3 | | | G | 0.299 | 0.409 | 63.2 | | |
| | B | 0.132 | 0.090 | 8.6 | | | B | 0.221 | 0.194 | 19.8 | | |
| | W | 0.336 | 0.341 | 29.8 | | | W | 0.324 | 0.325 | 36.9 | | |

*1)(Improvement over Comparative Example)

In comparison between the color characteristics of a combination of the color filter of Example 3 and a backlight source and a combination of the color filter of Comparative Examples 1 and a backlight source, both combination are equal in the color reproducibility range with the transmissive region chromaticity and brightness with the reflective region chromaticity. However, the range of color reproducibility in the reflective regions of the color filter of Examples 3 is 73% higher than that of Comparative Example 1. In comparison between the color characteristics of a combination of the color filter of Example 4 and a backlight source and a combination of the color filter of Comparative Example 1 and a backlight source, the combinations are equal in the color reproducibility range with the transmissive region chromaticity and the color reproducibility range with the reflective region chromaticity. However, brightness of the reflective regions of the color filter of Example 4 was 15% higher than that of Comparative Example 1.

In comparison between the display characteristics of a liquid crystal display comprising the color filter of each of Examples 3 and 4 and a three-peak type LED light source (RGB chip LEDs) and a liquid crystal display comprising the color filter of Comparative Example 2 and a two-peak type LED light source, the liquid crystal displays are equal in the color vividness of a transmissive display. Although the liquid crystal displays of Example 3 and Comparative Example 1 are equal in the brightness of a reflective display, the liquid crystal display of Example 3 exhibits higher color vividness and higher visibility. In comparison between the liquid crystal displays of Example 4 and Comparative Example 1, both liquid crystal displays are equal in the color reproducibility range in a reflective display. However, the liquid crystal display of Example 4 exhibits higher brightness and higher visibility even in the dark.

Comparative Example 2

A color filter substrate was formed by the same method as in Example 1 except that a colored film of each of red, green and blue picture elements was deposited to a thickness of 1.6 μm, and photomasks having aperture region ratios of 13%, 37% and 16% were used for photolithography of red, green and blue picture elements, respectively. As a result of measurement of the transmissive region chromaticity of each of the red, green and blue picture elements by using standard light source C, the degrees of chromaticity (x, y) of the red, green and blue picture elements were (0.606, 0.322), (0.311, 0.566), and (0.136, 0.108), respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 3

A color filter substrate was formed by the same method as in Comparative Example 2 except that photomasks having aperture region ratios of 14%, 41% and 17% were used for photolithography of red, green and blue picture elements, respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 4

A color filter substrate was formed by the same method as in Example 1 except that a colored film of each of red, green and blue picture elements was deposited to a thickness of 1.5 μm, and photomasks having aperture region ratios of 13%, 35% and 15% were used for photolithography of red, green and blue picture elements, respectively. As a result of measurement of the transmissive region chromaticity of each of the red, green and blue picture elements by using standard light source C, the degrees of chromaticity (x, y) of the red, green and blue picture elements were (0.599, 0.320), (0.313, 0.561), and (0.136, 0.111), respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 5

A color filter substrate was formed by the same method as in Comparative Example 3 except that photomasks having aperture region ratios of 14%, 41% and 18% were used for photolithography of red, green and blue picture elements, respectively. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Table 4 shows the reflective region chromaticity of the colored films measured with light source D65 and the transmissive region chromaticity measured with a three-peak type LED light source in each of Comparative Examples 2 and 3, the reflective region chromaticity of the colored films measured with light source D65 and the transmissive region chromaticity measured with an organic electroluminescence (EL) light source in each of Comparative Examples 4 and 5, and the reflective region chromaticity of the colored film measured with light source D65 and the transmissive region chromaticity measured with a two-peak type LED light source in Comparative Example 1.

chromaticity is lowered. Therefore, it is found that the three-peak type LED of the three-peak type light sources can significantly improve the color characteristics of a reflective display of a transflective liquid crystal display.

TABLE 4

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Comp. Example 1 | R | 0.630 | 0.349 | 23.4 | 60% | Two-peak type LED | R | 0.496 | 0.331 | 27.7 | 15% | 36.9 |
| | G | 0.333 | 0.576 | 57.3 | | | G | 0.299 | 0.409 | 63.2 | | |
| | B | 0.132 | 0.090 | 8.6 | | | B | 0.221 | 0.194 | 19.8 | | |
| | W | 0.336 | 0.341 | 29.8 | | | W | 0.324 | 0.325 | 36.9 | | |
| Comp. Example 2 | R | 0.608 | 0.329 | 24.2 | 60% | Three-peak type fluorescent light source | R | 0.501 | 0.332 | 27.2 | 17% (+13%) | 36.9 |
| | G | 0.324 | 0.587 | 64.9 | | | G | 0.301 | 0.419 | 64.0 | | |
| | B | 0.146 | 0.080 | 7.8 | | | B | 0.212 | 0.186 | 19.7 | | |
| | W | 0.336 | 0.345 | 32.3 | | | W | 0.322 | 0.326 | 36.9 | | |
| Comp. Example 3 | R | 0.608 | 0.329 | 24.2 | 60% | Three-peak type fluorescent light source | R | 0.494 | 0.332 | 27.9 | 15% | 38.1 (+3%) |
| | G | 0.324 | 0.587 | 64.9 | | | G | 0.303 | 0.409 | 66.0 | | |
| | B | 0.146 | 0.080 | 7.8 | | | B | 0.216 | 0.190 | 20.5 | | |
| | W | 0.336 | 0.345 | 32.3 | | | W | 0.321 | 0.324 | 38.1 | | |
| Comp. Example 4 | R | 0.638 | 0.321 | 28.5 | 60% | Three-peak type organic EL light source | R | 0.502 | 0.332 | 27.5 | 18% (+20%) | 36.9 |
| | G | 0.289 | 0.565 | 59.7 | | | G | 0.301 | 0.426 | 64.0 | | |
| | B | 0.129 | 0.135 | 14.2 | | | B | 0.207 | 0.180 | 19.1 | | |
| | W | 0.336 | 0.341 | 34.1 | | | W | 0.321 | 0.326 | 36.9 | | |
| Comp. Example 5 | R | 0.638 | 0.321 | 28.5 | 60% | Three-peak type organic EL light source | R | 0.494 | 0.332 | 28.3 | 15% | 38.9 (+5%) |
| | G | 0.289 | 0.565 | 59.7 | | | G | 0.303 | 0.410 | 66.8 | | |
| | B | 0.129 | 0.135 | 14.2 | | | B | 0.217 | 0.194 | 21.7 | | |
| | W | 0.336 | 0.341 | 34.1 | | | W | 0.321 | 0.324 | 38.9 | | |

*1)(Improvement over Comparative Example)

In comparison between the color characteristics of a combination of the color filter of Comparative Example 2 and a backlight source, a combination of the color filter of Comparative Example 4 and a backlight source, and a combination of the color filter of Comparative Example 1 and a backlight source, the combinations are equal in the color reproducibility range with the transmissive region chromaticity and brightness with the reflective region chromaticity. On the other hand, the rates of improvement in the range of color reproducibility with reflective region chromaticity of Comparative Examples 2 and 3 are 13% and 20%, respectively, as compared with that of Comparative Example 1. These rates of improvement are lower than that in the use of the three-peak type LED light source. In comparison between the color characteristics of a combination of the color filter of Comparative Example 3 and a backlight source, a combination of the color filter of Comparative Examples 5 and a backlight source, and a combination of the color filter of Comparative Example 1 and a backlight source, the combinations are equal in the color reproducibility range with the transmissive region chromaticity and brightness with the reflective region chromaticity. On the other hand, the rates of improvement in brightness with the reflective region chromaticity of Comparative Examples 2 and 3 are 3% and 5%, respectively, as compared with that of Comparative Example 1. These rates of improvement are lower than that in the use of the three-peak type LED light source. These results are possibly due to the fact that the three-peak type fluorescent light source used in Comparative Example 2 has relatively large side peaks near 490 nm and 580 nm. It is also thought that the three-peak type organic EL light source used in Comparative Example 3 has a broad peak over the entire spectrum, and thus the improvement in the color characteristics with the reflective region Comparative Example 6

Figure 6:
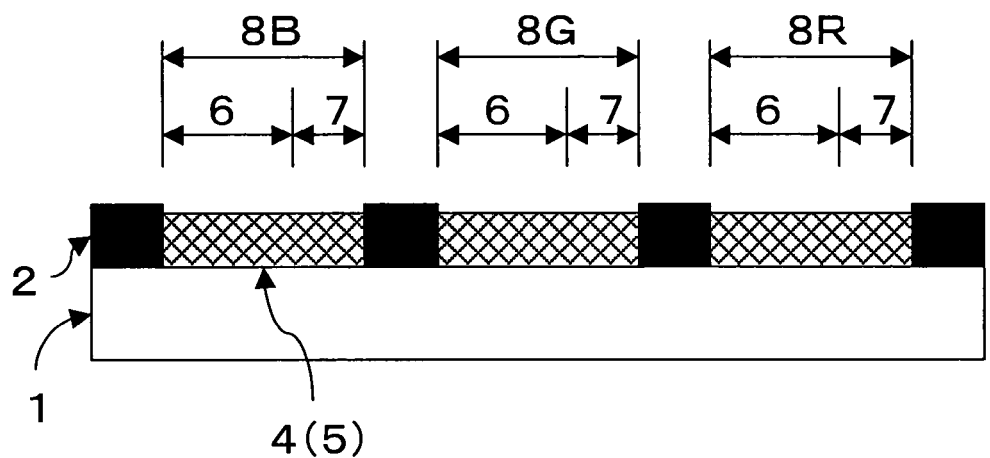
FIG. 6 is a drawing showing the configuration of a color filter used in a transflective liquid crystal display.
Figure 7:
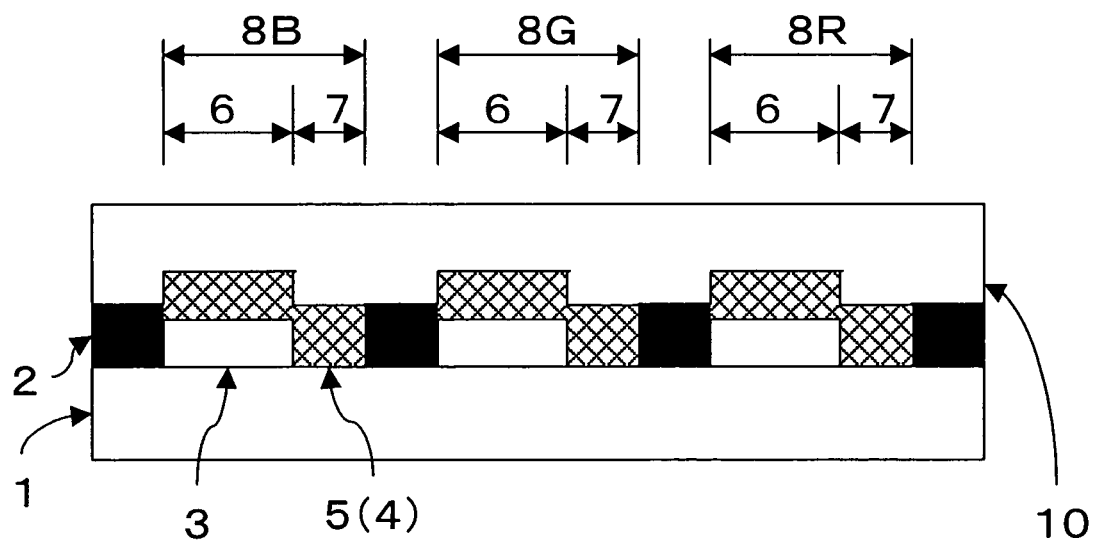
FIG. 7 is a drawing showing the configuration of a color filter used in a transflective liquid crystal display.
Figure 8:
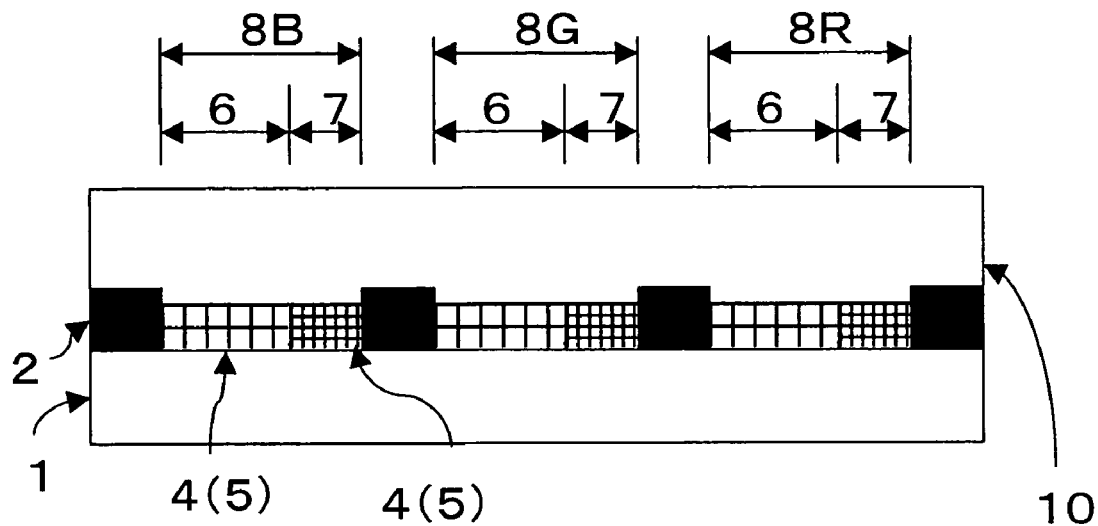
FIG. 8 is a drawing showing the configuration of a color filter used in a transflective liquid crystal display.
Figure 9:
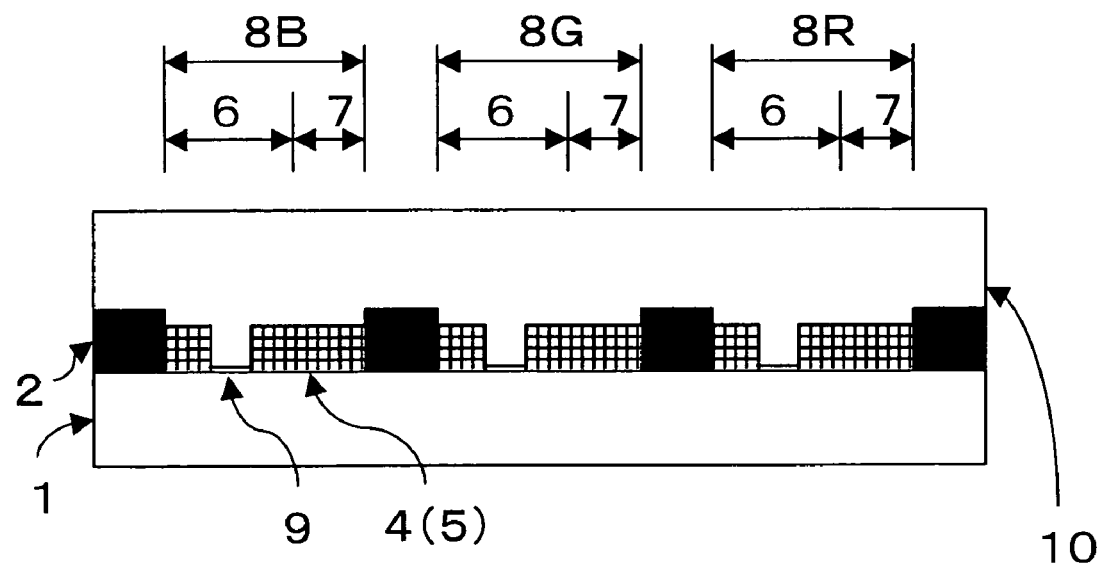
FIG. 9 is a drawing showing the configuration of a color filter used in a transflective liquid crystal display.

A color filter substrate having a conventional configuration was formed by the same method as in Example 1 except that a photomask having an aperture region ratio of zero was used for photolithography of red, green and blue picture elements so as to form reflective regions and transmissive regions having the same color characteristics, as shown in FIG. 6. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 7

A color filter substrate having a conventional configuration was formed by the same method as in Comparative Example 1 except that a photomask having an aperture region ratio of zero was used for photolithography of red, green and blue picture elements so as to form reflective regions and transmissive regions having the same color characteristics, as shown in FIG. 6. Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Table 5 shows the reflective region chromaticity of the colored films measured with light source D65 and the transmissive region chromaticity measured with a three-peak type LED light source (ultraviolet LED+RGB phosphors) in Comparative Example 6, and the reflective region chromaticity of the colored films measured with light source D65 and the transmissive region chromaticity measured with a two-peak type LED light source in Comparative Example 7.

TABLE 5

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Comp. Example 6 | R | 0.618 | 0.294 | 32.4 | 60% | Three-peak type LED (UV-LED + RGB phosphors) | R | 0.645 | 0.334 | 19.3 | 71% | 26.8 (+25%) |
| | G | 0.271 | 0.596 | 62.0 | | | G | 0.289 | 0.603 | 53.3 | | |
| | B | 0.137 | 0.165 | 20.1 | | | B | 0.135 | 0.090 | 7.7 | | |
| | W | 0.336 | 0.341 | 38.2 | | | W | 0.321 | 0.348 | 26.8 | | |
| Comp. Example 7 | R | 0.630 | 0.349 | 23.4 | 60% | Two-peak type LED | R | 0.663 | 0.333 | 16.9 | 84% | 21.4 |
| | G | 0.333 | 0.576 | 57.3 | | | G | 0.261 | 0.638 | 42.6 | | |
| | B | 0.132 | 0.090 | 8.6 | | | B | 0.137 | 0.070 | 4.5 | | |
| | W | 0.336 | 0.341 | 29.8 | | | W | 0.330 | 0.352 | 21.4 | | |

*1)(Improvement over Comparative Example)

In comparison between the color characteristics of a combination of the color filter of Comparative Example 6 and a backlight source, and a combination of the color filter of Comparative Example 7 and a backlight source, brightness with the reflective region chromaticity measured with the three-peak type LED light source is 25% higher than that in the use of the two-peak type LED light source. Although an improvement in brightness is high, the absolute value (Y value of white W) of brightness is only 26.8, and thus the color filter is very dark as a color filter for a transflective liquid crystal display. Therefore, a combination of the three-peak type LED light source and the color filter having the conventional configuration cannot satisfy the characteristics required for a transflective liquid crystal display. Therefore, it is found that a color filter is required to have a configuration comprising transmissive regions and reflective regions having different color characteristics.

Example 5

The non-photosensitive paste (TPI-1) was coated on a glass substrate having a black matrix pattern formed thereon.

The coating film was dried at 120° C. for 20 minutes in an oven, and then a positive photoresist (TOKYO OHKA KOGYO CO., LTD. OFPR-800) was coated on the coating film and then dried at 90° C. for 10 minutes in an oven. The substrate was exposed with 60 mJ/cm$^2$ (strength of ultraviolet light at 365 nm) by Canon Inc. Proximity Exposure "PLA-501F" through a photomask pattern to leave a transparent resin layer in a reflective region of each of red, green and blue picture elements. After exposure, the substrate was dipped in a developer comprising a 1.6% aqueous solution of tetramethylammonium hydroxide to simultaneously perform development of the photoresist and etching of the polyamic acid coating film. After etching, the unnecessary photoresist layer was removed with acetone, and the remaining layer was heat-treated at 240° C. for 30 minutes to obtain the transparent resin layer in the reflective region of each of the picture elements. The thickness of each transparent resin layer was 1.8 μm.

Next, the red resist (RAC-1) was coated by a spinner on the glass substrate having the transparent resin layers, and then the resultant coating film was heat-treated in an oven at 80° C. for 10 minutes. The coating film was then exposed with 100 mJ/cm$^2$ (strength of ultraviolet light at 365 nm) by an ultraviolet exposure apparatus through a chromium photomask for transmitting light through the transmissive regions and reflective regions of red picture elements. After exposure, the substrate was dipped in a developer comprising a 1.6% aqueous solution of tetramethylammonium hydroxide to develop colored layers. After development, a heat treatment was performed in an oven at 240° C. for 30 minutes to obtain the red picture elements. The thickness at the center of the transmissive region of each picture element was 1.2 μm, and the chromaticity (x, y) with standard light source C was (0.567, 0.310). The total thickness (the total thickness of the coating films of TPI-1 and RAC-1) at the center of the transmissive region of each red picture element was 2.3 μm, and the ratio of the thickness of the colored layer in each reflective region to that in each transmissive region was 2/5.

Similarly, the green resist (GAC-1) was coated by a spinner on the glass substrate to form a colored coating film. The coating thickness at the center of the transmissive region of each picture element was 1.2 μm, and the chromaticity (x, y) with standard light source C was (0.321, 0.541). The total thickness (the total thickness of the coating films of TPI-1 and GAC-1) at the center of the transmissive region of each green picture element was 2.3 μm, and the ratio of the thickness of the colored layer in each reflective region to that in each transmissive region was 2/5.

Figure 12:
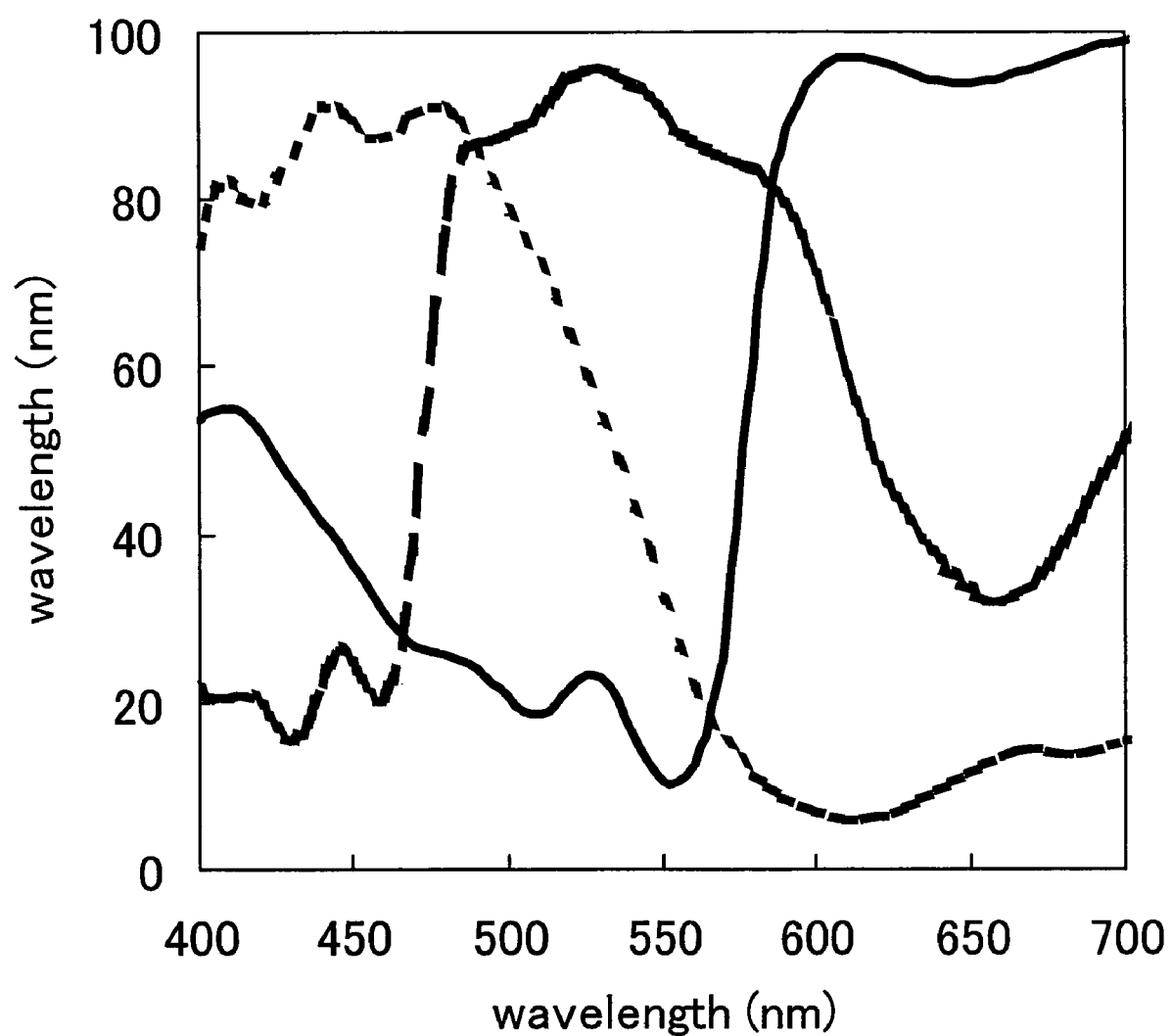
FIG. 12 is a chart showing a spectrum of a reflective region in Example 5 (combination of a thickness-controlling system color filter and a three-peak type LED)
Figure 13:
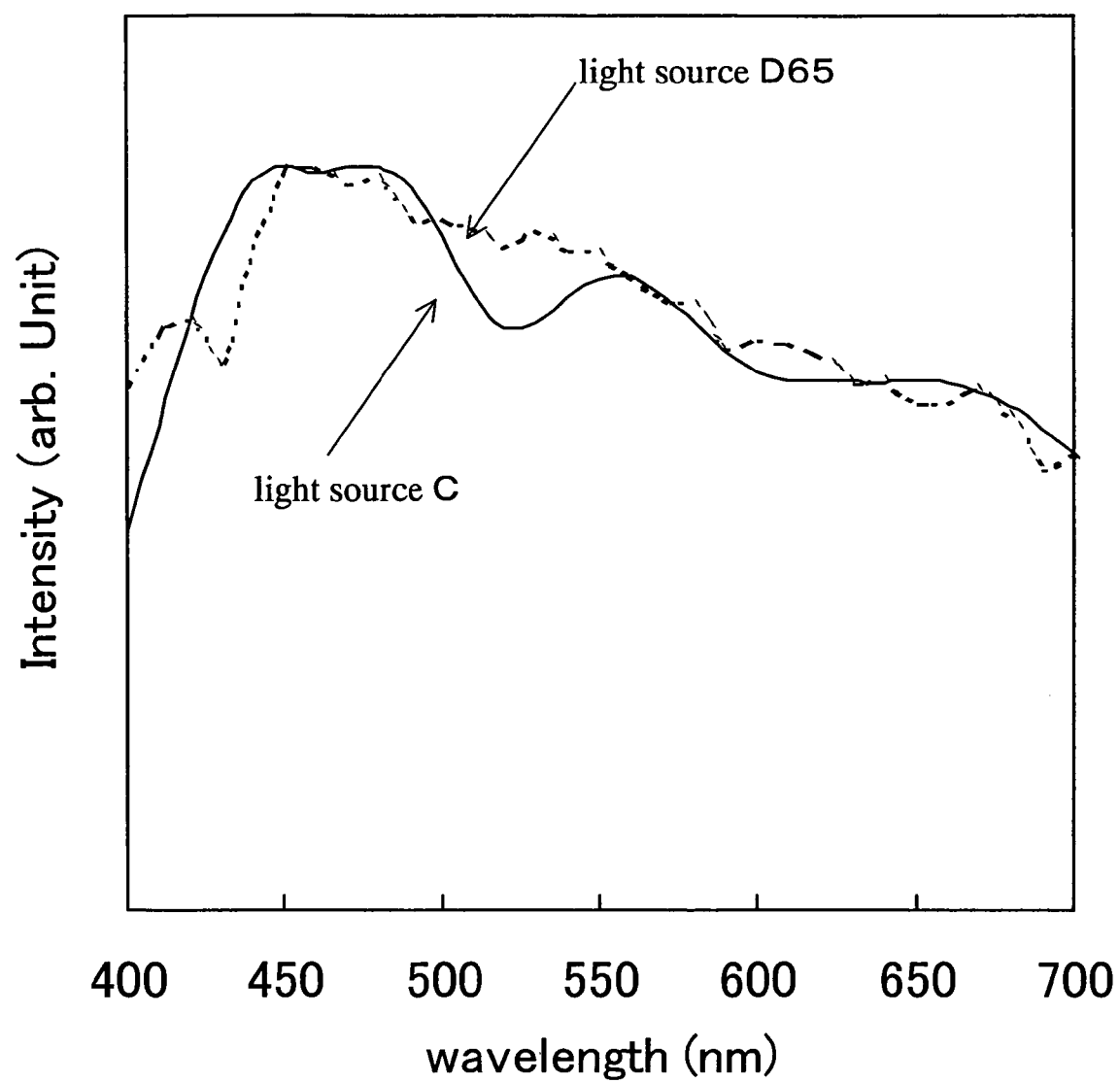
FIG. 13 is a chart showing the spectra of standard light source C and light source D65.
Figure 14:
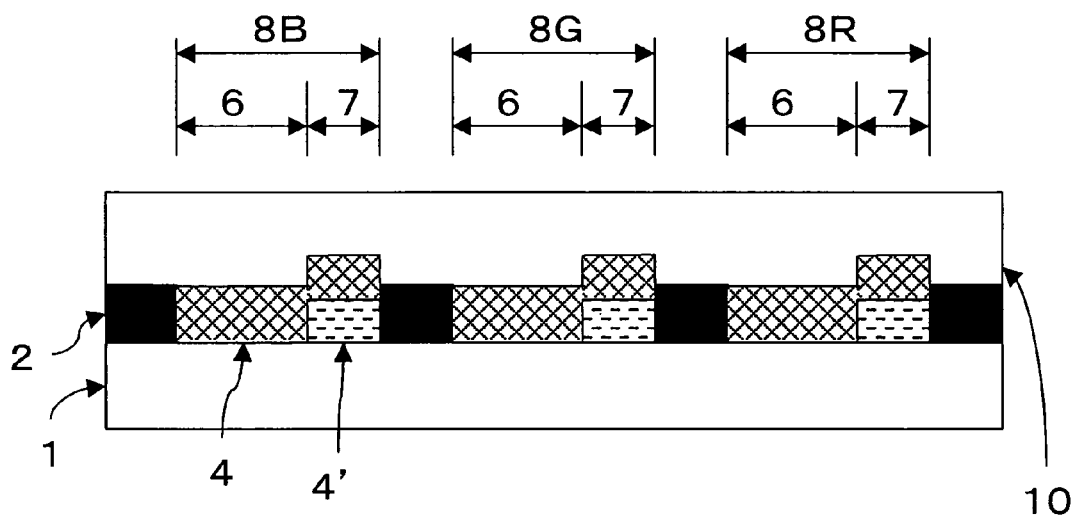
FIG. 14 is a drawing showing the configuration of a color filter of Example 11.
Figure 15:
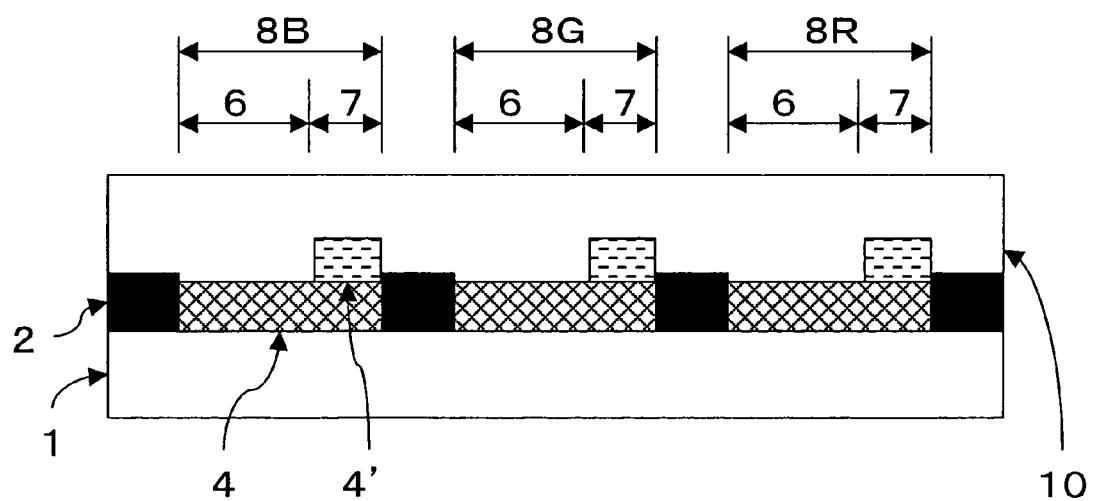
FIG. 15 is a drawing showing the configuration of a color filter of Example 12.

Similarly, the blue resist (BAC-1) was coated by a spinner on the glass substrate to form a colored coating film. The coating thickness at the center of the transmissive region of each picture element was 1.2 μm, and the chromaticity (x, y) with standard light source C was (0.138, 0.127). The total thickness (the total thickness of the coating films of TPI-1 and BAC-1) at the center of the transmissive region of each picture element was 2.3 μm, and the ratio of the thickness of the colored layer in each reflective region to that in each transmissive region was 2/5. Then, an over coat layer (JRS Corporation, "Optomer SS6500/SS0500") was deposited to a thickness of 2 μm on the picture element layer formed as described above. Furthermore, an over coat layer (JRS Corporation, "Optomer SS6500/SS0500") was deposited to a thickness of 2 μm on the over coat layer, and an ITO film was deposited to a thickness of 0.1 μm on the over coat layer by sputtering. For the thus-formed color filter substrate, the spectrum of each of the central picture element and the four corner picture elements of the substrate was measured. FIG. 10 shows a spectrum in a transmissive region, and FIG. 12 shows a spectrum in a reflective region.

Comparative Example 8

A transparent resin layer was coated, by the same method as in Example 5, on a glass substrate having a black matrix pattern formed thereon. The thickness of the transparent resin layer was 2.6 μm.

Next, the red resist (RAC-1) was coated by a spinner on the glass substrate having the transparent resin layer to obtain red picture elements in the same manner as in Example 5. The thickness at the center of the transmissive region of each picture element was 1.8 μm, and the chromaticity (x, y) with standard light source C was (0.622, 0.328). The total thickness (the total thickness of the coating films of TPI-1 and RAC-1) at the center of the transmissive region of each picture element was 3.4 μm, and the ratio of the thickness of the colored layer in each reflective region to that in each transmissive region was 2/5.

Similarly, the green resist (GAC-1) was coated by a spinner on the glass substrate to form a colored coating film. The coating thickness at the center of the transmissive region of each picture element was 1.8 μm, and the chromaticity (x, y) with standard light source C was (0.298, 0.581). The total thickness (the total thickness of the coating films of TPI-1 and GAC-1) at the center of the transmissive region of each picture element was 3.4 μm, and the ratio of the thickness of the colored layer in each reflective region to that in each transmissive region was 2/5.

Similarly, the blue resist (BAC-1) was coated by a spinner on the glass substrate to form a colored coating film. The coating thickness at the center of the transmissive,region of each picture element was 1.8 μm, and the chromaticity (x, y) with standard light source C was (0.135, 0.099). The total thickness (the total thickness of the coating films of TPI-1 and BAC-1) at the center of the transmissive region of each picture element was 3.4 μm, and the ratio of the thickness of the colored-layer in each reflective region to that in each transmissive region was 2/5. Then, an over coat layer and an ITO film were deposited on the resulting picture element layer by the same method as in Example 5. For the thus-formed color filter substrate, the spectrum of each of the central picture element and the four corner picture elements of the substrate was measured.

Table 6 shows the reflective region chromaticity of the colored coating films measured with light source D65 and the transmissive region chromaticity measured with a three-peak type LED light source (ultraviolet LED+RGB phosphors) in Example 5, and the reflective region chromaticity of the colored coating films measured with light source D65 and the transmissive region chromaticity measured with a two-peak type LED light source in Comparative Example 8.

In comparison between the color characteristics of a combination of the color filter of Example 5 and a backlight source and a combination of the color filter of Comparative Example 8 and a backlight source, both combinations are equal in the color reproducibility range with the transmissive region chromaticity. However, white brightness with reflective region chromaticity in Example 5 is higher than that in Comparative Example 8, and a reflective display with higher visibility,can be expected.

In comparison between the display characteristics of a liquid crystal display comprising the color filter of Example 5 and a three-peak type LED light source (ultraviolet LED+ RGB phosphors) and a liquid crystal display comprising the color filter of Comparative Example 8 and a two-peak type LED light source, the liquid crystal display are equal in the color vividness of a transmissive display. However, the liquid crystal display of Comparative Example 8 exhibits insufficient brightness and low visibility in a reflective display. On the other hand, the liquid crystal display of Example 5 exhibits high brightness and high visibility in a reflective display.

In this way, in a transflective liquid crystal display using a two-peak type LED and a thickness-controlling system color filter in which the color reproducibility of a transmissive display is increased, a reflective display with sufficient brightness cannot be achieved from the viewpoint of processing. However, in the use of a three-peak type LED, a reflective display with sufficient brightness can be obtained. Namely, it can be said that a transmissive display with vividness and a reflective display with sufficient brightness can be realized only by a combination of a three-peak type LED and a thickness-controlling system color filter.

Example 6

A transparent resin layer was formed, by the same method as in Example 5, in a portion corresponding to the reflective region of each of red and blue picture elements on a glass substrate having a black matrix pattern. The thickness of the transparent resin layers was 1.8 μm.

Next, the red resist (RAC-1) was coated by a spinner on the glass substrate having the transparent resin layers to obtain red picture elements in the same manner as in Example 10. The thickness at the center of the transmissive region of each picture element was 1.2 μm, and the chromaticity (x, y) with standard light source C was (0.567, 0.310). The total thickness (the total thickness of the coating films of TPI-1 and RAC-1) at the center of the transmissive region of each picture element was 2.3 μm, and the ratio of the thickness of the, colored layer in each reflective region to that in each transmissive region was 2/5.

Similarly, the blue resist (BAC-1) was coated by a spinner on the glass substrate to form a colored coating film. The coating thickness at the center of the transmissive region of

TABLE 6

| | | Transmissive region chromaticity | | | | | Reflective region chromaticity (light source D65) | | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Example 5 | R | 0.618 | 0.294 | 32.4 | 60% | Three-peak type LED (UV-LED + RGB phosphors) | R | 0.537 | 0.305 | 27.5 | 38% | 38.3 (+13%) |
| | G | 0.271 | 0.596 | 62.0 | | | G | 0.320 | 0.527 | 68.8 | | |
| | B | 0.137 | 0.165 | 20.1 | | | B | 0.140 | 0.157 | 18.6 | | |
| | W | 0.336 | 0.341 | 38.2 | | | W | 0.315 | 0.339 | 38.3 | | |
| Comp. Example 8 | R | 0.630 | 0.349 | 23.4 | 60% | Two-peak type LED | R | 0.599 | 0.321 | 24.1 | 55% | 33.8 |
| | G | 0.333 | 0.576 | 57.3 | | | G | 0.306 | 0.570 | 64.3 | | |
| | B | 0.132 | 0.090 | 8.6 | | | B | 0.135 | 0.122 | 13.0 | | |
| | W | 0.336 | 0.341 | 29.8 | | | W | 0.319 | 0.344 | 33.8 | | |

*1)(Improvement over Comparative Example)

each picture element was 1.2 µm, and the chromaticity (x, y) with standard light source C was (0.138, 0.127). The total thickness (the total thickness of the coating films of TPI-1 and BAC-1) at the center of the transmissive region of each picture element was 2.3 µm, and the ratio of the thickness of the colored layer in each reflective region to that in each transmissive region was 2/5.

Next, the green resist (GAC-1) was coated by a spinner in the transmissive regions of green picture elements to form colored coating films by the same method as in Example 5. The coating thickness at the center of the transmissive region of each picture element was 1.2 µm, and the chromaticity (x, y) with standard light source C was (0.321, 0.541).

Next, the green resist (GAC-1) was further coated by a spinner in the transmissive regions of the green picture elements to form colored coating films by the same method as in Example 5. The coating thickness at the center of the transmissive region of each picture element was 1.2 µm, and the chromaticity (x, y) with standard light source C was (0.321, 0.541). Next, the green resist (GAC-2) was coated by a spinner in the reflective regions of the green picture elements to form colored coating films by the same method as in Example 5. The coating thickness at the center of the reflective region of each picture element was 1.2 µm, and the chromaticity (x, y) with standard light source C was (0.329, 0.444).

Then, an over coat layer and an ITO film were deposited on the resulting picture element layer by the same method as in Example 5. For the thus-formed color filter substrate, the spectrum of each of the central picture element and the four corner picture elements of the substrate was measured.

thickness (the total thickness of the coating films of TPI-1 and BAC-1) at the center of the transmissive region of each picture element was 3.4 µm, and the ratio of the thickness of the colored layer in each reflective region to that in each transmissive region was 2/5.

Next, the green resist (GAC-1) was coated by a spinner in the transmissive regions of green picture elements to form colored coating films by the same method as in Example 5. The coating thickness at the center of the transmissive region of each picture element was 1.2 µm, and the chromaticity (x, y) with standard light source C was (0.321, 0.541). Next, the green resist (GAC-2) was coated by a spinner in the reflective regions of the green picture elements to form colored coating films by the same method as in Example 5. The coating thickness at the center of the reflective region of each picture element was 1.2 µm, and the chromaticity (x, y) with standard light source C was (0.329, 0.444).

Then, an over coat layer and an ITO film were deposited on the resulting picture element layer by the same method as in Example 5. For the thus-formed color filter substrate, the spectrum of each of the central picture element and the four corner picture elements of the substrate was measured.

Table 7 shows the reflective region chromaticity of the colored coating films measured with light source D65 and the transmissive region chromaticity measured with a three-peak type LED light source (ultraviolet LED+RGB phosphors) in Example 6, and the reflective region chromaticity of the colored coating films measured with light source D65 and the transmissive region chromaticity measured with a two-peak type LED light source in Comparative Example 9.

TABLE 7

|  |  | Transmissive region chromaticity | | | | | Reflective region chromaticity (light source D65) | | | | |
| --- | --- | --- | --- | --- | --- | --- | --- | --- | --- | --- | --- |
|  |  | x | y | Y | Color reproducibility | Light source |  | x | y | Y | Color reproducibility*1) | Brightness(Y value of W)*1) |
| Example 6 | R | 0.618 | 0.294 | 32.4 | 60% | Three-peak type LED (UV-LED + RGB phosphors) | R | 0.537 | 0.305 | 27.5 | 38% | 38.9 (+8%) |
|  | G | 0.271 | 0.596 | 62.0 |  |  | G | 0.322 | 0.527 | 70.6 |  |  |
|  | B | 0.137 | 0.165 | 20.1 |  |  | B | 0.140 | 0.157 | 18.6 |  |  |
|  | W | 0.336 | 0.341 | 38.2 |  |  | W | 0.316 | 0.341 | 38.9 |  |  |
| Comp. Example 9 | R | 0.630 | 0.349 | 23.4 | 60% | Two-peak type LED | R | 0.599 | 0.321 | 24.1 | 48% | 35.9 |
|  | G | 0.333 | 0.576 | 57.3 |  |  | G | 0.322 | 0.527 | 70.6 |  |  |
|  | B | 0.132 | 0.090 | 8.6 |  |  | B | 0.135 | 0.122 | 13.0 |  |  |
|  | W | 0.336 | 0.341 | 29.8 |  |  | W | 0.324 | 0.341 | 35.9 |  |  |

*1)(Improvement over Comparative Example)

Comparative Example 9

A transparent resin layer was formed, by the same method as in-Example 5, on a glass substrate having a black matrix pattern formed thereon. The thickness of the transparent resin layer was 2.6 µm.

Next, the red resist (RAC-1) was coated by a spinner on the glass substrate having the transparent resin layer to obtain red picture elements in the same manner as in Example 5. The thickness at the center of the transmissive region of each picture element was 1.8 µm, and the chromaticity (x, y) with standard light source C was (0.622, 0.328). The total thickness (the total thickness of the coating films of TPI-1 and RAC-1) at the center of the transmissive region of each picture element was 3.4 µm, and the ratio of the thickness of the colored layer in each reflective region to that in each transmissive region was 2/5.

Similarly, the blue resist (BAC-1) was coated by a spinner on the glass substrate to form a colored coating film. The coating thickness at the center of the transmissive region of each picture element was 1.8 µm, and the chromaticity (x, y) with standard light source C was (0.135, 0.099). The total In comparison between the color characteristics of a combination of the color filter of Example 6 and a backlight source and a combination of the color filter of Comparative Example 9 and a backlight source, both combinations are equal in the color reproducibility range with the transmissive region chromaticity and the color reproducibility range with the reflective region chromaticity. However, brightness of the reflective regions of Example 6 is 8% higher than that in Comparative Example 9.

In comparison between the display characteristics of a liquid crystal display comprising the color filter of Example 6 and a three-peak type LED light source (ultraviolet LED+ RGB phosphors) and a liquid crystal display comprising the color filter of Comparative Example 9 and a two-peak type LED light source, the liquid crystal displays are equal in the color vividness of a transmissive display. However, the liquid crystal display of Example 6 exhibits high brightness in a reflective display and high visibility even in the dark. On the other hand, the liquid crystal display of Comparative Example 9 produces a dark reflective display to make a display slightly hard to see.

In this way, in a transflective liquid crystal display using a two-peak type LED and a color filter in which reflective regions and transmissive regions of one of the colors have different coating characteristics, and the transmissive regions and reflective regions of the other two colors are formed in a thickness-controlling system, when the color reproducibility of a transmissive display is increased, a reflective display with sufficient brightness cannot be achieved. However, in the use of a three-peak type LED, a reflective display with sufficient brightness can be obtained. Namely, it can be said that a transmissive display with vividness and a reflective display with sufficient brightness can be realized only by a combination of a three-peak type LED and a color filter containing picture elements of at least one color formed in a thickness-controlling system.

Example 7

A transparent resin layer was formed, by the same method as in Example 5, on a glass substrate having a black matrix pattern formed thereon. The thickness of the transparent resin layer was 2.0 µm.

Next, the red resist (RAC-1) was coated by a spinner on the glass substrate having the transparent resin layer to obtain red picture elements in-the same manner as in Example 5. The thickness at the center of the transmissive region of each picture element was 1.4 µm, and the chromaticity (x, y) with standard light source C was (0.588, 0.316). The total thickness (the total thickness of the coating films of tPI-1 and RAC-1) at the center of the transmissive region of each picture element was 2.6 µm, and the ratio of the thickness of the colored layer in each reflective region to that in each transmissive region was 2/5.

Similarly, the green resist (GAC-1) was coated on the substrate to form a colored coating film by a spinner. The coating thickness at the center of the transmissive region of each picture element was 1.4 µm, and the chromaticity (x, y) with standard light source C was (0.316, 0.554). The total thickness (the total thickness of the coating films of TPI-1 and GAC-1) at the center of the transmissive region of each picture element was 2.6 µm, and the ratio of the thickness of the colored layer in each reflective region to that in each transmissive region was 2/5.

Similarly, the blue resist (BAC-1) was coated on the glass substrate by a spinner to form a colored coating film. The coating thickness at the center of the transmissive region of each picture element was 1.4 µm, and the chromaticity (x, y) with standard light source C was (0.136, 0.117). The total thickness (the total thickness of the coating films of TPI-1 and BAC-1) at the center of the transmissive region of each picture element was 2.6 µm, and the ratio of the thickness of the colored layer in each reflective region to that in each transmissive region was 2/5.

Then, an over coat layer and an ITO film were deposited on the resulting picture element layer by the same method as in Example 5. For the thus-formed color filter substrate, the spectrum of each of the central picture element and the four corner picture elements of the substrate was measured.

Comparative Example 10

A transparent resin layer was formed, by the same method as in Example 5, on a glass substrate having a black matrix pattern formed thereon. The thickness of the transparent resin layer was 3.2 µm. Next, the red resist (RAC-1) was coated by a spinner on the glass substrate having the transparent resin layer to obtain red picture elements in the same manner as in Example 5. The thickness at the center of the transmissive region of each picture element was 2.3 µm, and the chromaticity (x, y) with standard light source C was (0.644, 0.333). The total thickness (the total thickness of the coating films of TPI-1 and RAC-1) at the center of the transmissive region of each picture element was 4.1 µm, and the ratio of the thickness of the colored layer in each reflective region to that in each transmissive region was 2/5.

Similarly, the green resist (GAC-1) was coated on the substrate by a spinner to form a colored coating film. The coating thickness at the center of the transmissive region of each picture element was 2.3 µm, and the chromaticity (x, y) with standard light source C was (0.287, 0.601). The total thickness (the total thickness of the coating films of TPI-1 and GAC-1) at the center of the transmissive region of each picture element was 4.1 µm, and the ratio of the thickness of the colored layer in each reflective region to that in each transmissive region was 2/5.

Similarly, the blue resist (BAC-1) was coated on the glass substrate by a spinner to form a colored coating film. The coating thickness at the center of the transmissive region of each picture element was 2.3 µm, and the chromaticity (x, y) with standard light source C was (0.136, 0.085). The total thickness (the total thickness of the coating films of TPI-1 and BAC-1) at the center of the transmissive region of each picture element was 4.1 µm, and the ratio of the thickness of the colored layer in each reflective region to that in each transmissive region was 2/5.

Then, an over coat layer and an ITO film were deposited on the resulting picture element layer by the same method as in Example 5. For the thus-formed color filter substrate, the spectrum of each of the central picture element and the four corner picture elements of the substrate was measured.

Table 8 shows the reflective region chromaticity of the colored coating films measured with light source D65 and the transmissive region chromaticity measured with a three-peak type LED light source (ultraviolet LED+RGB phosphors) in Example 7, and the reflective region chromaticity of the colored coating films measured with light source D65 and the transmissive region chromaticity measured with a two-peak type LED light source in Comparative Example 10.

TABLE 8

| | | Transmissive region chromaticity | | | | | | Reflective region chromaticity (light source D65) | | | | |
|---|---|---|---|---|---|---|---|---|---|---|---|---|
| | | x | y | Y | Color reproducibility | Light source | | x | y | Y | Color reproducibility*1) | Brightness(Y value of W)*1) |
| Example 7 | R | 0.634 | 0.298 | 31.0 | 68% | Three-peak type LED (UV-LED + RGB phosphors) | R | 0.509 | 0.315 | 30.5 | 22% | 42.2 (+28%) |
| | G | 0.255 | 0.617 | 59.4 | | | G | 0.314 | 0.435 | 74.3 | | |
| | B | 0.137 | 0.151 | 17.5 | | | B | 0.166 | 0.175 | 21.7 | | |
| | W | 0.336 | 0.341 | 36.0 | | | W | 0.316 | 0.323 | 42.2 | | |

TABLE 8-continued

|  |  | Transmissive region chromaticity | | | | | Reflective region chromaticity (light source D65) | | | | | |
|---|---|---|---|---|---|---|---|---|---|---|---|---|
|  |  | x | y | Y | Color reproducibility | Light source |  | x | y | Y | Color reproducibility*1) | Brightness(Y value of W)*1) |
| Comp. Example 10 | R | 0.644 | 0.349 | 21.1 | 68% | Two-peak type LED | R | 0.513 | 0.331 | 26.4 | 22% | 33.0 |
|  | G | 0.322 | 0.596 | 51.1 |  |  | G | 0.295 | 0.437 | 57.5 |  |  |
|  | B | 0.133 | 0.077 | 6.6 |  |  | B | 0.204 | 0.169 | 15.1 |  |  |
|  | W | 0.336 | 0.340 | 26.3 |  |  | W | 0.326 | 0.329 | 33.0 |  |  |

*1)(Improvement over Comparative Example)

In comparison between the color characteristics of a combination of the color filter of Example 7 and a backlight source and a combination of the color filter of Comparative Example 10 and a backlight source, both combinations are equal in the color reproducibility range with the transmissive region chromaticity and the color reproducibility range with the reflective region chromaticity. However, brightness of the reflective regions of Example 7 is 28% higher than that in Comparative Example 10.

In comparison between the display characteristics of a liquid crystal display comprising the color filter of Example 7 and a three-peak type LED light source (ultraviolet LED+ RGB phosphors) and a liquid crystal display comprising the color filter of Comparative Example 10 and a two-peak type LED light source, both liquid crystal displays are equal in the color vividness of a transmissive display. However, the liquid crystal display of Example 7 exhibits high brightness in a reflective display and high visibility even in the dark. On the other hand, the liquid crystal display of Comparative Example 10 produces a dark reflective display to make a display hard to see.

In this way, in a transflective liquid crystal display using a two-peak type LED and a color filter in which a thickness-controlling system and an area-controlling system are combined, when the color reproducibility of a transmissive display is increased, a reflective display with sufficient brightness cannot be achieved. However, in the use of a three-peak type LED, a reflective display with sufficient brightness can be obtained. Namely, it can be said that a transmissive display with vividness and a reflective display with sufficient brightness can be realized only by a combination of a three-peak type LED and a color filter in which the thickness-controlling system and the area-controlling system are combined.

Comparative Example 11

The red resist (RAC-2), green resist (GAC-2) and blue resist (BAC-2) were coated in the reflective regions of red picture elements, green picture elements, and blue picture elements, respectively, on a substrate by a spinner to form colored coating films in the same manner as in Example 5. The coating thickness at the center of the transmissive region of each of the red, green and blue picture elements was 1.2 µm, and the degrees of chromaticity (x, y) of the red, green and blue picture elements with standard light source C were (0.453, 0.308), (0.329, 0.444), and (0.170, 0.205), respectively. Then, colored coating films were formed in the respective transmissive regions of the red, green and blue picture elements by the same method as in Example 5.

Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Comparative Example 12

Color coated layers were formed by the same method as in Comparative Example 11 except that color coated layers were formed in the respective transmissive regions of red picture elements, and green picture elements and blue picture elements by the same manner as in Comparative Example 8.

Then, an over coat layer and an ITO film were deposited on the resultant picture element film by the same method as in Example 1. For the thus-formed color filter substrate, the spectrum of each of the central picture element and the four corner picture elements of the substrate was measured. The measured spectra of the picture elements were averaged.

Table 9 shows the reflective region chromaticity of the colored coating films measured with light source D65 and the transmissive region chromaticity measured with a three-peak type LED light source (ultraviolet LED+RGB phosphors) in Comparative Example 11, and the reflective region chromaticity of the colored coating films measured with light source D65 and the transmissive region chromaticity measured with a two-peak type LED light source in Comparative Example 12.

TABLE 9

|  |  | Transmissive region chromaticity | | | | | Reflective region chromaticity (light source D65) | | | | | |
|---|---|---|---|---|---|---|---|---|---|---|---|---|
|  |  | x | y | Y | Color reproducibility | Light source |  | x | y | Y | Color reproducibility*1) | Brightness(Y value of W)*1) |
| Comp. Example 11 | R | 0.618 | 0.294 | 32.4 | 60% | Three-peak type LED (UV-LED + RGB phosphors) | R | 0.573 | 0.328 | 25.7 | 41% | 38.4 (0%) |
|  | G | 0.271 | 0.596 | 62.0 |  |  | G | 0.322 | 0.527 | 70.6 |  |  |
|  | B | 0.137 | 0.165 | 20.1 |  |  | B | 0.139 | 0.159 | 18.9 |  |  |
|  | W | 0.336 | 0.341 | 38.2 |  |  | W | 0.315 | 0.348 | 38.4 |  |  |
| Comp. Example 12 | R | 0.630 | 0.349 | 23.4 | 60% | Two-peak type LED | R | 0.573 | 0.328 | 25.7 | 41% | 38.4 |
|  | G | 0.333 | 0.576 | 57.3 |  |  | G | 0.322 | 0.527 | 70.6 |  |  |
|  | B | 0.132 | 0.090 | 8.6 |  |  | B | 0.139 | 0.159 | 18.9 |  |  |
|  | W | 0.336 | 0.341 | 29.8 |  |  | W | 0.315 | 0.348 | 38.4 |  |  |

*1)(Improvement over Comparative Example)

In comparison between the color characteristics of a combination of the color filter of Comparative Example 11 and a backlight source and a combination of the color filter of Comparative Example 12 and a backlight source, both combinations are equal in the color reproducibility range with the transmissive region chromaticity, and are the same in characteristics with the reflective region chromaticity.

In comparison between the display characteristics of a liquid crystal display comprising the color filter of Comparative Example 11 and a three-peak type LED light source (ultraviolet LED+RGB phosphors) and a liquid crystal display comprising the color filter of Comparative Example 12 and a two-peak type LED light source, both liquid crystal display are equal in the color vividness of a transmissive displays. Also, the liquid crystal displays of Comparative Examples 11 and 12 are the same in characteristics of a reflective display.

In this way, in a six-color coating system, the colored coating films in the transmissive regions are formed independently of those in the reflective regions, and thus a change of the backlight source causes no effect of improving the characteristics of the reflective display.

Table 10 shows the effect of improving the brightness of a reflective display in each of the above-described liquid crystal displays of the present invention.

TABLE 10

|  | RGB-LED | UV-LED + RGB phosphors | Organic EL | Cold-cathode tube |
|---|---|---|---|---|
| Area control | ◯ 15% | ◯ 12% | Δ 5% | Δ 3% |
| Thickness control |  | ◯ 13% |  |  |
| Six-color coating |  | X 0% |  |  |

This table indicates that even in a reflective display using environmental light, brightness is improved by a combination of the area-controlling system or thickness-controlling system color filter and a three-peak type backlight source. It is also found that brightness is improved particularly when a LED light source among the three-peak type light sources is used.

Example 8

The red paste (R-1) was coated by a spinner on a glass substrate having a black matrix pattern formed thereon so that the chromaticity (x, y) measured by passing light of standard light source C through the glass substrate was (0.466, 0.294). The resultant coating film was dried at 120° C. for 20 minutes, and then a positive photoresist (TOKYO OHKA KOUGYO CO., LTD. "OFPR-800") was coated on the coating film and dried at 90° C. for 10 minutes. The coating film was then exposed to light by using Canon Inc. "Proximity Exposure PLA-501F" through a chromium photomask with a strength of 60 mJ/cm$^2$ (strength of ultraviolet light at 365 nm). The photomask used had an aperture ratio (aperture region ratio) of 12% in reflective regions. After exposure, the substrate was dipped in a developer comprising a 2.25% aqueous solution of tetramethylammonium hydroxide to simultaneously perform development of the photoresist and etching of the colored film of polyimide precursor. After etching, the unnecessary photoresist layer was removed with acetone. Furthermore, the colored film of polyamide precursor was heat-treated at 240° C. for 30 minutes to convert the polyamide precursor to polyimide. Next, the blue paste (B-1) was coated so that the final chromaticity (x, y) measured by passing light of standard light source C through the glass substrate was (0.152, 0.190), and then photolithography was performed by the same method as that used for the red picture elements. The photomask used had an aperture ratio (aperture region ratio) of 9% in the reflective regions. Next, the color paste (G-1) was coated by a spinner so that the final chromaticity (x, y) measured by passing light of standard light source C through the glass substrate was (0.309, 0.373), and then photolithography was performed by the same method as that used for the red picture elements. The photomask used for green picture elements had an aperture region ratio of zero. Finally, the color paste (G-2) was coated by a spinner to laminate green colored layers in the transmissive regions of the green picture elements. The chromaticity (x, y) of the transmissive regions of the green picture elements, which was measured by using standard light source C, was (0.284, 0.443). Then, an over coat layer was deposited to a thickness of 2 μm on the thus-obtained picture element layer, and an ITO film was deposited to a thickness of 0.1 μm by sputtering on the over coat layer. For the thus-obtained color filter substrate, the spectrum of each of the central picture element and the four corner picture elements of the substrate was measured. Table 11 shows the reflective region chromaticity measured with light source D65, the transmissive region chromaticity measured with a two-peak type LED light source, and chromaticity difference δ of the resultant color filter.

TABLE 11

|  | Transmissive region chromaticity (two-peak type LED light source) | | | Reflective region chromaticity (light source D65) | | | Chromaticity difference δ |
|---|---|---|---|---|---|---|---|
|  | x | y | Y | x | y | Y |  |
| R | 0.489 | 0.332 | 42.6 | 0.485 | 0.331 | 33.1 | $1.7 \times 10^{-5}$ |
| G | 0.307 | 0.438 | 68.7 | 0.308 | 0.438 | 67.9 | $1.5 \times 10^{-7}$ |
| B | 0.154 | 0.186 | 26.1 | 0.168 | 0.185 | 21.6 | $1.9 \times 10^{-4}$ |

Comparative Example 13

A color filter was formed by the same method as in Example 8 except that a photomask producing no aperture region in each picture element was used for photolithography of red, blue and green picture elements, each green picture element was not formed by laminating, and the final chromaticity measured by passing light of standard light source C was different from that in Example 8. In this comparative example, the red paste (R-1), green paste (G-1) and blue paste (B-1) were used. The degrees of chromaticity (x, y) of the red picture elements, the green picture elements, and the blue picture elements, which were measured by passing light of standard light source C, were (0.405, 0.285), (0.309, 0.373), and (0.178, 0.225), respectively.

For the thus-formed color filter substrate, the spectrum of each of the central picture element and the four corner picture elements of the substrate was measured. The measured spectra of the picture elements were averaged. Table 12 shows the reflective region chromaticity measured with light source D65, the transmissive region chromaticity measured with a two-peak type LED light source, and chromaticity difference δ of the resultant color filter.

TABLE 12

| | Transmissive region chromaticity (two-peak type LED light source) | | | Reflective region chromaticity (light source D65) | | | Chromaticity difference δ |
|---|---|---|---|---|---|---|---|
| | x | y | Y | x | y | Y | |
| R | 0.425 | 0.317 | 54.0 | 0.486 | 0.304 | 32.6 | $3.9 \times 10^{-3}$ |
| G | 0.328 | 0.379 | 86.0 | 0.308 | 0.438 | 67.9 | $3.8 \times 10^{-3}$ |
| B | 0.184 | 0.227 | 36.8 | 0.143 | 0.187 | 22.3 | $3.3 \times 10^{-3}$ |

Comparative Example 14

A color filter was formed by the same method as in Example 8 except that a photomask patterned to produce an aperture region ratio of 26% in each green element was use for photolithography of the green picture elements, green paste was coated so that the final chromaticity measured by passing light of standard light source C was (0.303, 0.440), and the green picture elements were not formed by laminating the paste. The red paste (R-1), green paste (G-1) and blue paste (B-1) were used.

For the thus-formed color filter substrate, the spectrum of each of the central picture element and the four corner picture elements of the substrate was measured. The measured spectra of the picture elements were averaged. Table 13 shows the reflective region chromaticity measured with light source D65, the transmissive region chromaticity measured with a two-peak type LED light source, and chromaticity difference δ of the resultant color filter.

TABLE 13

| | Transmissive region chromaticity (two-peak type LED light source) | | | Reflective region chromaticity (light source D65) | | | Chromaticity difference δ |
|---|---|---|---|---|---|---|---|
| | x | y | Y | x | y | Y | |
| R | 0.489 | 0.332 | 42.6 | 0.485 | 0.331 | 33.1 | $1.7 \times 10^{-5}$ |
| G | 0.326 | 0.437 | 74.2 | 0.300 | 0.438 | 62.3 | $6.6 \times 10^{-4}$ |
| B | 0.154 | 0.186 | 26.1 | 0.168 | 0.185 | 21.6 | $1.9 \times 10^{-4}$ |

The display characteristics of a transflective liquid crystal display comprising the color filter of each of Comparative Examples 13 and 14 were compared with the characteristics of a liquid crystal display comprising the color filter of Example 8 under a condition in which outdoor environmental light was used in a reflective display with the backlight source turned off, and the backlight source was turned on in a transmissive display in the dark. In the transmissive display, a two-peak type LED light source was used as a light source. The liquid crystal display manufactured by a conventional technique in Comparative Example 1 exhibited a light color over the entire transmissive display and a great difference in visibility from the reflective display. On the other hand, the liquid crystal display using the color filter of Example 8 had substantially no color difference between the reflective display and the transmissive display, and thus exhibited good display characteristics. The liquid crystal display of Comparative Example 14 exhibited good colors in the reflective display and the transmissive display, as compared with Comparative Example 13. However, a slight change in coloring was observed between the liquid crystal displays of Comparative Example 14 and Example 8, and the brightness of the reflective display of Comparative Example 14 was lower than that of Example 8.

Example 9

The red paste (R-2) was coated by a spinner on a glass substrate having a black matrix pattern formed thereon, the red paste being controlled to the ratio shown in Table 1 so that the chromaticity (x, y) measured by passing light of standard light source C through the glass substrate was (0.405, 0.301). The resultant coating film was dried at 120° C. for 20 minutes, and then a positive photoresist (TOKYO OHKA KOUGYO CO., LTD. "OFPR-800") was coated on the coating film and dried at 90° C. for 10 minutes. The coating film was then exposed to light by using Canon Inc. "Proximity Exposure "PLA-501F" through a chromium photomask with a strength of 60 mJ/cm² (strength of ultraviolet light at 365 nm) a photomask producing an aperture region ratio of zero in red picture elements was used. After exposure, the substrate was dipped in a developer comprising a 2.25% aqueous solution of tetramethylammonium hydroxide to simultaneously perform development of the photoresist and etching of the colored film of polyimide precursor. After etching, the unnecessary photoresist layer was removed with acetone. Furthermore, the colored film of polyamide precursor was heat-treated at 240° C. for 30 minutes to convert the polyamide precursor to polyimide. Next, the color paste (G-1) was coated by a spinner so that the final chromaticity (x, y) measured by passing light of standard light source C was (0.307, 0.426), and then photolithography was performed by the same method as that used for the red picture elements. The photomask used had an aperture ratio (aperture region ratio) of 23% in the reflective regions. Next, the color paste (B-1) was coated so that the chromaticity (x, y) measured by passing light of standard light source C through the glass substrate was (0.148, 0.182), and then photolithography was performed by the same method as that used for the red picture elements. The photomask used had an aperture ratio (aperture region ratio) of 10% in the reflective regions. Finally, the color paste (R-3) controlled to the ratio shown in Table 1 was coated by a spinner to laminate a red colored layer over the entire transmissive regions of the red picture elements and in a 50% area of the transmissive regions of each blue picture element. The chromaticity (x, y) of the transmissive regions of the red picture elements, which was measured by using standard light source C, was (0.474, 0.326). The chromaticity (x, y) of the transmissive regions of the blue picture elements, which was measured by using standard light source C, was (0.171, 0.169). Then, an over coat layer was deposited to a thickness of 2 μm on the thus-obtained picture element layer, and an ITO film was deposited to a thickness of 0.1 μm by sputtering on the over coat layer.

For the thus-obtained color filter substrate, the spectrum of each of the central picture element and the four corner picture elements of the substrate was measured. The measured spectra of the picture elements were averaged. Table 14 shows the reflective region chromaticity measured with light source D65, the transmissive region chromaticity measured with a three-peak type LED light source (RGB chip LEDs), and chromaticity difference δ of the resultant color filter.

TABLE 14

| | Transmissive region chromaticity (three-peak type LED light source) | | | Reflective region chromaticity (light source D65) | | | Chromaticity difference δ |
|---|---|---|---|---|---|---|---|
| | x | y | Y | x | y | Y | |
| R | 0.488 | 0.321 | 41.1 | 0.488 | 0.323 | 33.4 | $2.9 \times 10^{-6}$ |
| G | 0.298 | 0.438 | 74.5 | 0.305 | 0.438 | 61.4 | $4.9 \times 10^{-5}$ |
| B | 0.169 | 0.186 | 21.4 | 0.174 | 0.187 | 20.9 | $3.2 \times 10^{-5}$ |

Comparative Example 15

In forming a color filter, a photomask having a pattern for producing an aperture region ratio of 11% in each red element was used for photolithography of red picture elements, and a photomask having a pattern for producing an aperture region ratio of 12% in each blue element was used in photolithography for blue picture elements. In this comparative example, the red paste (R-2), green paste (G-1) and blue paste (B-1) were used. Each of the red picture elements and blue picture elements was not formed by laminating the paste. The degrees of chromaticity (x, y) of the red picture elements and the blue picture elements, which were measured by passing light of standard light source C, were (0.469, 0.313) and (0.141, 0.167), respectively. For the green picture elements, the green paste was coated and processed by the same method as in Example 9.

For the thus-formed color filter substrate, the spectrum of each of the central picture element and the four corner picture elements of the substrate was measured. The measured spectra of the picture elements were averaged. Table 15 shows the reflective region chromaticity measured with light source D65, the transmissive region chromaticity measured with a three-peak type LED light source (RGB chip LEDs), and chromaticity difference δ of the resultant color filter.

TABLE 15

| | Transmissive region chromaticity (three-peak type LED light source) | | | Reflective region chromaticity (light source D65) | | | Chromaticity difference δ |
|---|---|---|---|---|---|---|---|
| | x | y | Y | x | y | Y | |
| R | 0.488 | 0.308 | 36.8 | 0.488 | 0.344 | 31.0 | $1.2 \times 10^{-3}$ |
| G | 0.298 | 0.438 | 74.5 | 0.305 | 0.438 | 61.4 | $4.9 \times 10^{-5}$ |
| B | 0.139 | 0.187 | 24.8 | 0.183 | 0.187 | 20.1 | $1.9 \times 10^{-3}$ |

The display characteristics of a transflective liquid crystal display comprising the color filter of Comparative Example 15 were compared with the characteristics of a liquid crystal display comprising the color filter of Example 9 under a condition in which outdoor environmental light was used in a reflective display with the backlight source turned off, and the backlight source was turned on in a transmissive display in the dark. In the transmissive display, a three-peak type LED light source (RGB chip LEDs) was used as a light source. The liquid crystal display using the color filter of Comparative Example 15 and the liquid crystal display of Example 9 exhibited the same color vividness. However, the liquid crystal display using the color filter of Example 9 had substantially no color difference between the reflective display and the transmissive display, and thus exhibited good display characteristics.

Example 10

The red paste (R-1) was coated by a spinner on a glass substrate having a black matrix pattern formed thereon so that the chromaticity (x, y) measured by passing light of standard light source C through the glass substrate was (0.466, 0.294). The resultant coating film was dried at 120° C. for 20 minutes, and then a positive photoresist (TOKYO OHKA KOUGYO CO., LTD. "OFPR-800") was coated on the coating film and dried at 90° C. for 10 minutes. The coating film was then exposed to light by using Canon Inc. "Proximity Exposure "PLA-501F" through a chromium photomask with a strength of 60 mJ/cm² (strength of ultraviolet light at 365 nm). The photomask used had an aperture ration (aperture region ratio) of 12% in reflective regions. After exposure, the substrate was dipped in a developer comprising a 2.25% aqueous solution of tetramethylammonium hydroxide to simultaneously perform development of the photoresist and etching of the colored film of polyamide precursor. After etching, the unnecessary photoresist layer was removed with acetone. Furthermore, the colored film of polyamide precursor was heat-treated at 240° C. for 30 minutes to convert the polyamide precursor to polyimide. Next, the blue paste (B-2) was coated so that the final chromaticity (x, y) measured by passing light of standard light source C through the glass substrate was (0.200, 0.232), and then photolithography was performed by the same method as that used for the red picture elements a photomask producing no aperture region in the blue picture elements was used. Next, the color paste (G-1) was coated by a spinner so that the chromaticity (x, y) measured by passing light of standard light source C through the glass substrate was (0.309, 0.373), and then photolithography was performed by the same method as that used for the red picture elements. A photomask producing no aperture region in the green picture elements was used. Next, the color paste (G-2) was coated by a spinner to laminate a green colored layer on the transmissive region of each green picture element. The chromaticity (x, y) measured by passing light of standard light source C through the transmissive regions of the green picture elements was (0.284, 0.443). Finally, the color paste (B-1) was coated by a spinner to laminate a blue colored layer in the transmissive region of each blue picture elements. The chromaticity (x, y) measured by using standard light source C through the transmissive regions of the blue picture elements was (0.158, 0.188). Then, an over coat layer was deposited to a thickness of 2 μm on the thus-obtained picture element layer, and an ITO film was deposited to a thickness of 0.1 μm by sputtering on the over coat layer.

For the thus-obtained color filter substrate, the spectrum of each of the central picture element and the four corner picture elements of the substrate was measured. The measured spectra of the picture elements were averaged. Table 16 shows the reflective region chromaticity measured with light source D65, the transmissive region chromaticity measured with a two-peak type LED light source, and chromaticity difference δ of the resultant color filter.

TABLE 16

| | Transmissive region chromaticity (two-peak type LED light source) | | | Reflective region chromaticity (light source D65) | | | Chromaticity difference δ |
|---|---|---|---|---|---|---|---|
| | x | y | Y | x | y | Y | |
| R | 0.489 | 0.332 | 42.6 | 0.485 | 0.331 | 33.1 | $1.7 \times 10^{-5}$ |
| G | 0.307 | 0.438 | 68.7 | 0.308 | 0.438 | 67.9 | $1.5 \times 10^{-7}$ |
| B | 0.160 | 0.187 | 25.2 | 0.155 | 0.186 | 22.1 | $3.0 \times 10^{-5}$ |

The display characteristics of a transflective liquid crystal display comprising the color filter of Comparative Example 14 were compared with the characteristics of a liquid crystal display comprising the color filter of Example 10 under a condition in which outdoor environmental light was used in a reflective display with the backlight source turned off, and the backlight source was turned on in a transmissive display in the dark. In the transmissive display, a two-peak type LED light source was used as a light source. The liquid crystal display of Example 10 had substantially no color difference between the reflective display and the transmissive display, and thus exhibited good display characteristics. However, a slight change in coloring was observed between the liquid crystal displays of Comparative Example 14 and Example 10, and the brightness of the reflective display of Comparative Example 14 was lower than that of Example 10.

Example 11

The red paste (R-4) was coated by a spinner on a glass substrate having a black matrix pattern formed thereon. The resultant coating film was dried at 120° C. for 20 minutes, and then a positive photoresist (TOKYO OHKA KOUGYO CO., LTD. "OFPR-800") was coated on the coating film and dried at 90° C. for 10 minutes. The coating film was then exposed to light by using Canon Inc. "Proximity Exposure "PLA-501F" through a chromium photomask with a strength of 60 mJ/cm$^2$ (strength of ultraviolet light at 365 nm). In this example, a photomask leaving a colored layer only in the transmissive region of each red picture element was used after exposure, the substrate was dipped in a developer comprising a 2.25% aqueous solution of tetramethylammonium hydroxide to simultaneously perform development of the photoresist and etching of the colored film of polyimide precursor. After etching, the unnecessary photoresist layer was removed with acetone. Furthermore, the colored film of polyamide precursor was heat-treated at 240° C. for 30 minutes to convert the polyamide precursor to polyimide. The thickness of each colored layer was 1.4 μm, and the chromaticity measured by passing light of standard light source C was (0.429, 0.281). Next, green picture elements and blue picture elements were formed by the same method as that used for the red picture elements. In this case, the green pate G-3 and the blue paste B-3 were used. The thickness of each green colored layer was 1.4 μm, and the chromaticity measured by passing light of standard light source C was (0.291, 0.457). The thickness of each blue colored layer was 1.4 μm, and the chromaticity measured by passing light of standard light source C was (0.191, 0.241). As a result, the transmissive regions were formed.

Next, colored layer patterns were formed in the transmissive regions and the reflective regions by the same method as that for forming the transmissive regions except that a photomask leaving color layers in the transmissive regions and the reflective regions was used, and the color pastes below were used. As a result, two-color layers were laminated in each of the transmissive regions. In this case, the color paste R-6, the color paste G-5 and the blue paste B-5 were used for the red, green and blue picture elements, respectively. The thickness of the colored layer of the reflective region of each picture element was 1.4 μm. The degrees of chromaticity (x, y) of the red, green blue picture elements, which were measured by passing light of standard light source C, were (0.453, 0.308), (0.329, 0.444), and (0.170, 0.205), respectively.

Then, an over coat layer was deposited to a thickness of 2 μm on the thus-obtained picture element layer, and an ITO film was deposited to a thickness of 0.1 μm by sputtering on the over coat layer.

For the thus-obtained color filter substrate, the spectrum of each of the central picture element and the four corner picture elements of the substrate was measured. The measured spectra of the picture elements were averaged. Table 17 shows the reflective region chromaticity measured with light source D65, the transmissive region chromaticity measured with a three-peak type LED light source, and chromaticity difference δ of the resultant color filter.

TABLE 17

| | Transmissive region chromaticity (two-peak type LED light source) | | | Reflective region chromaticity (light source D65) | | | Chromaticity difference δ |
|---|---|---|---|---|---|---|---|
| | x | y | Y | x | y | Y | |
| R | 0.574 | 0.338 | 28.5 | 0.573 | 0.328 | 25.7 | 1.0 × 10$^{-4}$ |
| G | 0.321 | 0.527 | 58.8 | 0.322 | 0.527 | 70.6 | 1.1 × 10$^{-6}$ |
| B | 6.143 | 0.159 | 20.0 | 0.139 | 0.159 | 18.9 | 1.3 × 10$^{-5}$ |

Example 12

The transmissive regions and reflective regions were first formed, and then the transmissive regions were further formed. Namely, colored layer patterns were formed by the same method as in Example 11 except that the order of picture element formation was opposite to that in Example 11.

Then, an over coat layer was deposited to a thickness of 2 μm on the thus-obtained picture element layer, and an ITO film was deposited to a thickness of 0.1 μm by sputtering on the over coat layer.

For the thus-obtained color filter substrate, the spectrum of each of the central picture element and the four corner picture elements of the substrate was measured. The measured spectra of the picture elements were averaged. Table 18 shows the reflective region chromaticity measured with light source D65, the transmissive region chromaticity measured with a three-peak type LED light source, and chromaticity difference δ of the resultant color filter.

TABLE 18

| | Transmissive region chromaticity (two-peak type LED light source) | | | Reflective region chromaticity (light source D65) | | | Chromaticity difference δ |
|---|---|---|---|---|---|---|---|
| | x | y | Y | x | y | Y | |
| R | 0.574 | 0.338 | 28.5 | 0.573 | 0.328 | 25.7 | 1.0 × 10$^{-4}$ |
| G | 0.321 | 0.527 | 58.8 | 0.322 | 0.527 | 70.6 | 1.1 × 10$^{-6}$ |
| B | 0.143 | 0.159 | 20.0 | 0.139 | 0.159 | 18.9 | 1.3 × 10$^{-5}$ |

Comparative Example 16

Colored layer patterns were formed in the transmissive regions by the same method as in Example 11 except that the color pastes below were used. In this comparative example, the red paste R-5, green paste G-4 and blue paste B-4 were used. The thickness of the colored layer in the transmissive region of each picture element was 1.4 μm. The degrees of chromaticity (x, y) of the red picture elements, the green picture elements, and the blue picture elements, which were measured by passing light of standard light source C, were (0.552, 0.306), (0.298, 0.538), and (0.139, 0.159), respectively.

Next, colored layer patterns were formed in the reflective regions by the same method as the above method used for forming the transmissive regions except that a photomask leaving a colored layer only in each reflective region, and the color pastes below were used. In this comparative example, the red paste R-6, green paste G-5 and blue paste B-5 were used. The thickness of the colored layer in the transmissive region of each picture element was 1.4 μm. The degrees of chromaticity (x, y) of the red picture elements, the green picture elements, and the blue picture elements, which were measured by passing light of standard light source C, were (0.453, 0.308), (0.329, 0.444), and (0.170, 0.205), respectively.

Then, an over coat layer was deposited to a thickness of 2 μm on the thus-obtained picture element layer, and an ITO film was deposited to a thickness of 0.1 μm by sputtering on the over coat layer.

For the thus-formed color filter substrate, the spectrum of each of the central picture element and the four corner picture elements of the substrate was measured. The measured spectra of the picture elements were averaged. Table 19 shows the reflective region chromaticity measured with light source D65, the transmissive region chromaticity measured with a three-peak type LED light source, and chromaticity difference δ of the resultant color filter.

TABLE 19

|   | Transmissive region chromaticity (two-peak type LED light source) | | | Reflective region chromaticity (light source D65) | | | Chromaticity difference δ |
|---|---|---|---|---|---|---|---|
|   | x | y | Y | x | y | Y |   |
| R | 0.574 | 0.337 | 28.1 | 0.573 | 0.328 | 25.7 | $7.8 \times 10^{-5}$ |
| G | 0.328 | 0.530 | 61.2 | 0.322 | 0.527 | 70.6 | $5.8 \times 10^{-5}$ |
| B | 0.139 | 0.150 | 18.6 | 0.139 | 0.159 | 18.9 | $7.5 \times 10^{-5}$ |

The display characteristics of a transflective liquid crystal display comprising the color filter of Comparative Example 16 were compared with the characteristics of a liquid crystal display comprising the color filter of each of Examples 11 and 12 under a condition in which outdoor environmental light was used in a reflective display with the backlight source turned off, and the backlight source was turned on in a transmissive display in the dark. In the transmissive display, a two-peak type LED light source was used as a light source. The liquid crystal display of each of Examples 11 and 12 had no color difference between the reflective display and the transmissive display, and thus exhibited good display characteristics. Although the liquid crystal display of Comparative Example 16 had no color difference between the reflective display and the transmissive display, several white luminescent spots and color ununiformity were observed on a screen. Therefore, the liquid crystal display of Comparative Example 16 had low image quality.

INDUSTRIAL APPLICABILITY

The present invention can provide a low-cost transflective liquid crystal display exhibiting high color reproducibility in a transmissive display and excellent characteristics (color reproducibility and brightness) in a reflective display. Also, a color filter for a bright transflective liquid crystal display capable of producing a small chromaticity difference between a reflective display and a transmissive display can be realized.

The invention claimed is:

1. A transflective liquid crystal display comprising a pair of substrates disposed opposite to each other with a liquid crystal layer held between the pair of substrates, a reflection means using ambient light as a light source, a backlight source, and a color filter having a transmissive region and a reflective region which are provided in each picture element of the color filter and which have colored layers comprising a single material, a three-peak type LED backlight source being used as the backlight source, wherein the color filter includes the picture elements of at least one color in each of which the colored layers of the transmissive region and the reflective region have the same thickness, and an aperture is formed in the reflective region, and wherein a color reproducibility of transmissive region chromaticity is 60% or mores, a color reproducibility of reflective region chromaticity is 15% to 38%, and a brightness of reflective region chromaticity is 36.9 or more.

2. The transflective liquid crystal display according to claim 1, wherein the x value of the transmissive region chromaticity of the red picture elements by using three-peak type LED backlight source satisfying the following relation, $x \geq 0.618$.

3. The transflective liquid crystal display according to claim 1, wherein the y value of the transmissive region chromaticity of the green picture elements by using three-peak type LED backlight source satisfying the following relation, $y \geq 0.574$.

4. A transflective liquid crystal display comprising a pair of substrates disposed opposite to each other with a liquid crystal layer held between the pair of substrates, a reflection means using ambient light as a light source, a backlight source, and a color filter having a transmissive region and a reflective region which are provided in each picture element of the color filter and which have colored layers comprising a single material, a three-peak type LED backlight source being used as the backlight source, wherein the color filter includes the picture elements of at least one color in each of which the colored layers of the reflective region, the transmissive region have different thicknesses, and the color filter has the aperture formed in each of the reflective regions, and wherein a color reproducibility of transmissive region chromaticity is 60% or more, a color reproducibility of reflective region chromaticity is 15% to 38%, and a brightness of reflective region chromaticity is 36.9 or more.

5. The transflective liquid crystal display according to claim 4, wherein the x value of the transmissive region chromaticity of the red picture elements by using three-peak type LED backlight source satisfying the following relation, $x \geq 0.618$.

6. The transflective liquid crystal display according to claim 4, wherein the y value of the transmissive region chromaticity of the green picture elements by using three-peak type LED backlight source satisfying the following relation, $y \geq 0.574$.

* * * * *